US010635986B2

(12) United States Patent
Miyakoshi et al.

(10) Patent No.: US 10,635,986 B2
(45) Date of Patent: Apr. 28, 2020

(54) INFORMATION PROCESSING SYSTEM AND INFORMATION PROCESSING METHOD

(71) Applicant: HITACHI, LTD., Chiyoda-ku, Tokyo (JP)

(72) Inventors: Junichi Miyakoshi, Tokyo (JP); Yasuyuki Kudo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 700 days.

(21) Appl. No.: 15/310,464

(22) PCT Filed: May 12, 2014

(86) PCT No.: PCT/JP2014/062563
§ 371 (c)(1),
(2) Date: Nov. 11, 2016

(87) PCT Pub. No.: WO2015/173854
PCT Pub. Date: Nov. 19, 2015

(65) Prior Publication Data
US 2017/0083824 A1    Mar. 23, 2017

(51) Int. Cl.
*G06N 7/00* (2006.01)
*G06F 16/901* (2019.01)
*G06F 8/35* (2018.01)

(52) U.S. Cl.
CPC .............. *G06N 7/005* (2013.01); *G06F 8/35* (2013.01); *G06F 16/9024* (2019.01)

(58) Field of Classification Search
CPC ........ G06N 7/005; G06F 16/9024; G06F 8/35
See application file for complete search history.

(56) References Cited

U.S. PATENT DOCUMENTS 8,429,184 B2 * 4/2013 Ismalon ............. G06F 16/9535
  707/765
2009/0228474 A1 * 9/2009 Chiu .................. G06F 16/2448
2011/0244875 A1 * 10/2011 Jabara .................. G06Q 10/10
  455/450

(Continued)

FOREIGN PATENT DOCUMENTS

AU         2009282574 A1 *  2/2010  ........... C07D 239/48

*Primary Examiner* — Kamran Afshar
*Assistant Examiner* — Imad M Kassim
(74) *Attorney, Agent, or Firm* — Miles & Stockbridge, P.C.

(57) ABSTRACT

To make it possible to perform efficient calculation on large-scale data that cannot be collected at one place or data updated momently.

An information processing system 100 includes a plurality of computers 220 having a graph structure as a model, the graph structure being formed by a plurality of vertices corresponding to events as objects of analysis and an edge connecting the corresponding vertices to each other according to relation between the corresponding events, the plurality of computers 220 corresponding to the respective vertices and being connected to each other so as to be able to send and receive data in correspondence with the edge. Each of the computers calculates the transition probability of identifier data between the computer and the computer corresponding to the adjacent vertex connected by the edge, by a predetermined algorithm based on the numbers of pieces of identifier data retained by the mutual computers, and updates the numbers of pieces of identifier data retained by the mutual computers according to a result of the calculation.

14 Claims, 41 Drawing Sheets

(56) References Cited

U.S. PATENT DOCUMENTS

| | | | |
|---|---|---|---|
| 2013/0151536 A1 | 6/2013 | Akoglu et al. | |
| 2013/0205014 A1* | 8/2013 | Muro | G06Q 10/06 709/224 |
| 2013/0222388 A1* | 8/2013 | McDonald | G06F 16/9024 345/440 |
| 2015/0098320 A1* | 4/2015 | Natarajan | H04L 47/125 370/230 |
| 2015/0163765 A1* | 6/2015 | Hobbs | H04W 4/21 455/41.2 |

* cited by examiner

TABLE OF NUMBERS OF INFORMATION ELEMENTS ON EACH VERTEX 150

| | VERTEX | | | | |
|---|---|---|---|---|---|
| | A | B | C | D | E |
| NUMBER OF INFORMATION ELEMENTS (STATE u) | 0 | 1 | 1 | 0 | 1 |
| NUMBER OF INFORMATION ELEMENTS (STATE v) | 2 | 0 | 0 | 2 | 0 |
| CLASSIFICATION RESULT | B | A | A | B | A |

FIG. 2

| WEIGHT | DELAY TIME |
|---|---|
| 1 | 1 |
| 10 | 10 |

TABLE OF RELATION BETWEEN WEIGHTS OF EDGES AND DELAY TIMES

TABLE OF RELATION BETWEEN NUMBERS OF INFORMATION ELEMENTS AND MOVEMENT DESTINATION REGIONS

TRANSITION PROBABILITY TABLE 1 ~ 8001

| TRANSITION PROBABILITY (INFORMATION ELEMENT u) $P_u$ | OWN VERTEX | | ADJACENT VERTEX | |
|---|---|---|---|---|
| | NUMBER OF INFORMATION ELEMENTS u $N_u$ | NUMBER OF INFORMATION ELEMENTS v $N_v$ | TOTAL NUMBER OF INFORMATION ELEMENTS u $\sum N_{ju}$ | TOTAL NUMBER OF INFORMATION ELEMENTS v $\sum N_{jv}$ |
| 0 | 10 OR MORE | 0 | 10 OR MORE | 0 |
| 0.1 | 10 OR MORE | 1 | 10 OR MORE | 1 |
| ... | | | | |
| 1.0 | 10 OR MORE | 10 | 10 OR MORE | 10 |
| 0.1 | 9 | 0 | 9 | 0 |
| ... | ... | ... | ... | ... |

FIG. 41

TRANSITION PROBABILITY TABLE 2
                                                                8002

| TRANSITION PROBABILITY (INFORMATION ELEMENT u) PU | OWN VERTEX | |
| --- | --- | --- |
| | NUMBER OF INFORMATION ELEMENTS u Nu | NUMBER OF INFORMATION ELEMENTS v Nv |
| 0 | 10 OR MORE | 0 |
| 0.1 | 10 OR MORE | 1 |
| ... | | |

FIG. 42

TRANSITION PROBABILITY TABLE 3        8003

| TRANSITION PROBABILITY (INFORMATION ELEMENT u) PU |
| --- |
| 1 |

FIG. 43

INFORMATION PROCESSING SYSTEM AND INFORMATION PROCESSING METHOD

TECHNICAL FIELD

The present invention relates to an information processing system and an information processing method that perform graph processing.

BACKGROUND ART

A technology is drawing attention in which technology, in order to design and operate a social infrastructure, a city, or the like efficiently, data distributed in the real world or a cyberspace is processed, the state of the social infrastructure or the like is analyzed and predicted, and elements constituting a society are controlled.

The above-described distributed data is constituted of environment sensing data such as temperature, humidity, or the like, log data on a machine such as an automobile or the like, log data on a human or an organization, such as that of email, SNS, or the like. In addition, details of the processing of such distributed data include clustering processing that classifies the data and adds labels or indexes, machine learning processing, and control processing that optimally arranges elements (humans, things, information, and the like) constituting a society. A result of the processing of the distributed data, which result is obtained by these pieces of processing, is spread out to distributed users or control objects. The users or the control objects for example determine moving means and a traveling direction or determine a control parameter according to the processing result.

The following technology has conventionally been proposed as such a technology. Specifically, the technology analyzes and predicts or controls a social infrastructure by integrating physically distributed sensing data into a computer system via communicating means such as the Internet or the like, processing the data, and spreading out a result of the processing to the control object (see Patent Document 1).

PRIOR ART DOCUMENT

Patent Document

Patent Document 1: US 2013/0151536

SUMMARY OF THE INVENTION

Problem to be Solved by the Invention

However, the conventional technology (Personalized Pagerank Algorithm) as described above requires synchronization between calculating entities when parallel calculation is performed, and cannot perform processing unless distributed data is integrated into a parallel computer. Further, a calculation result obtained by the calculation needs to be spread out to each distributed control object. Hence, the conventional technology cannot process very large scale data difficult to collect at one place, data that takes time to integrate and spread out and which is also updated momently, or the like.

It is accordingly an object of the present invention to provide a technology that makes it possible to perform efficient calculation on large-scale data that cannot be collected at one place or data updated momently.

Means for Solving the Problems

An information processing system according to the present invention for solving the above-described problem includes: a plurality of computers having a graph structure as a model, the graph structure being formed by a plurality of vertices corresponding to events as objects of analysis and an edge connecting the corresponding vertices to each other according to relation between the corresponding events, the plurality of computers corresponding to the respective vertices and being connected to each other so as to be able to send and receive data in correspondence with the edge; a storage device configured to retain identifier data having an attribute indicating one or more states for the events of the vertices, the identifier data being accumulated in each of the computers; and a display device configured to display a number of pieces of the identifier data retained in the storage device in relation to each of the vertices as a space distribution diagram based on distribution of the vertices; each of the computers calculating transition probability of identifier data between the computer and the computer corresponding to the adjacent vertex connected by the edge, by a predetermined algorithm based on the numbers of pieces of the identifier data retained by the mutual computers, and updating the numbers of pieces of the identifier data retained by the mutual computers according to a result of the calculation.

In addition, an information processing system according to the present invention includes: a managing computer; computers installed on respective racks within a warehouse; and portable terminals carried by respective workers collecting baggage arranged in the racks, the portable terminals being able to access the computers; each of the computers retaining information on numbers of pieces of identifier data of a plurality of kinds corresponding to predetermined events related to the racks or the baggage arranged in the corresponding racks, and receiving identifier data retained by each of the portable terminals when accessed by the portable terminal, transmitting identifier data determined on a basis of conditions of past changes in the identifier data already retained by the computer to the portable terminal, and updating the numbers of pieces of the identifier data of the plurality of kinds, the identifier data of the plurality of kinds being retained by the computer, on a basis of a subtracted number as a result of the transmission and reception of the identifier data to and from the portable terminal, each of the portable terminals receiving the identifier data from the computer, and updating identifier data retained by the portable terminal itself on a basis of the received identifier data, and each of the computers outputting, to the managing computer, an instruction to move the rack on which the computer itself is installed to an arrangement destination associated with a kind corresponding to a largest number of the numbers of pieces of the identifier data of the plurality of kinds, the identifier data of the plurality of kinds being retained by the computer itself, after passage of a predetermined time from the updating of the numbers of pieces of the identifier data.

In addition, an information processing system according to the present invention includes: a managing computer; and computers associated with respective pieces of data within a data center; each of the computers retaining information on numbers of pieces of identifier data of a plurality of kinds corresponding to predetermined events related to the data, and when accessed by programs using each of the pieces of data, receiving identifier data retained by the programs, giving the programs identifier data determined on a basis of conditions of past changes in the identifier data already retained by the computer, and updating the numbers of pieces of the identifier data of the plurality of kinds, the identifier data of the plurality of kinds being retained by the computer, on a basis of a subtracted number as a result of the transmission and reception of the identifier data to and from the programs, each of the programs receiving the identifier data from the computer, and updating identifier data retained by the program itself on a basis of the received identifier data, and each of the computers outputting, to the managing computer, an instruction to move the data with which the computer itself is associated to an arrangement destination associated with a kind corresponding to a largest number of the numbers of pieces of the identifier data of the plurality of kinds, the identifier data of the plurality of kinds being retained by the computer itself, after passage of a predetermined time from the updating of the numbers of pieces of the identifier data.

In addition, an information processing system according to the present invention includes: a plurality of terminals configured to transmit and receive a message via a network; and a managing computer; each of the terminals retaining information on numbers of pieces of identifier data of a plurality of kinds, when transmitting the message, transmitting, to another terminal among the plurality of terminals, the message to which identifier data determined on a basis of conditions of past changes in the numbers of pieces of identifier data already retained by the terminal itself is added, and updating the numbers of pieces of the identifier data of the plurality of kinds, the identifier data of the plurality of kinds being retained by the terminal itself, by subtracting a number of pieces of the transmitted identifier data, when receiving the message, updating the numbers of pieces of the identifier data of the plurality of kinds, the identifier data of the plurality of kinds being retained by the terminal itself, by adding a number of pieces of identifier data added to the received message, and transmitting, to the managing computer, the numbers of pieces of the identifier data of the plurality of kinds, the identifier data of the plurality of kinds being retained by the terminal itself, after passage of a predetermined time from the updating of the numbers of pieces of the identifier data, and the managing computer receiving the numbers of pieces of the identifier data of the plurality of kinds from each of the terminals, and displaying information indicating that terminals each having a largest number of pieces of identifier data belonging to a common kind are in a same group on a display terminal of the managing computer.

In addition, an information processing method according to the present invention includes: by a plurality of computers having a graph structure as a model, the graph structure being formed by a plurality of vertices corresponding to events as objects of analysis and an edge connecting the corresponding vertices to each other according to relation between the corresponding events, the plurality of computers corresponding to the respective vertices, being connected to each other so as to be able to send and receive data in correspondence with the edge, and retaining identifier data having an attribute indicating one or more states for the events of the vertices, calculating transition probability of identifier data between each of the computers and the computer corresponding to the adjacent vertex connected by the edge, by a predetermined algorithm based on numbers of pieces of the identifier data retained by the mutual computers, and updating the numbers of pieces of the identifier data retained by the mutual computers according to a result of the calculation; and displaying, on a display device, the number of pieces of the identifier data retained in relation to each of the vertices as a space distribution diagram based on distribution of the vertices.

Effect of the Invention

According to the present invention, it becomes possible to perform efficient calculation on large-scale data that cannot be collected at one place or data updated momently.

BRIEF DESCRIPTION OF THE DRAWINGS

FIG. 2 is a conceptual diagram of the graph structure model as an object of analysis in the first embodiment.

FIG. 41 is a diagram showing a first example of a transition probability table in an eighth embodiment.

FIG. 42 is a diagram showing a second example of the transition probability table in the eighth embodiment.

FIG. 43 is a diagram showing a third example of the transition probability table in the eighth embodiment.

MODES FOR CARRYING OUT THE INVENTION

Embodiments of the present invention will hereinafter be described in detail with reference to the drawings. The concept of a technical idea of an information processing method in a present embodiment will first be described with problems of the conventional technology also taken into account. The conventional technology can perform data analysis only after all of target data is collected at one place. In a case where large-scale data, or so-called big data, is an object of analysis, the conventional technology requires processing of efficiently collecting all pieces of data scattered over a very large area with immediacy, analyzing the data, and further sending a result of the analysis as a response to each object as an origin of data. It is particularly difficult to apply the conventional technology to data updated frequently. Accordingly, in order to solve such a problem, the information processing method according to the present embodiment performs autonomous distributed data analysis, that is, performs analysis for distributed data on a piece-by-piece basis. This autonomous distributed data analysis is a method in which each element (specifically a computer) managing distributed data performs a predetermined calculation on the data of the element itself and the data of another adjacent element, and the elements as a whole perform a desired calculation.

Phenomena corresponding to the concept of the above-described autonomous distribution are phenomena often observed in nature. For example, reaction-diffusion models in the field of biology are well known. In a model related to the formation of a striped pattern of a zebra, for example, among the reaction-diffusion models, it is considered that the striped pattern of a zebra occurs when the diffusion of protein in each cell is performed individually. The present embodiment illustrates a technology applied to data analysis with the reaction-diffusion model of such autonomous distribution replaced with conditions in which the diffusion of things, information, or the like is individually performed at various places and various elements.

First Embodiment

Figure 1:
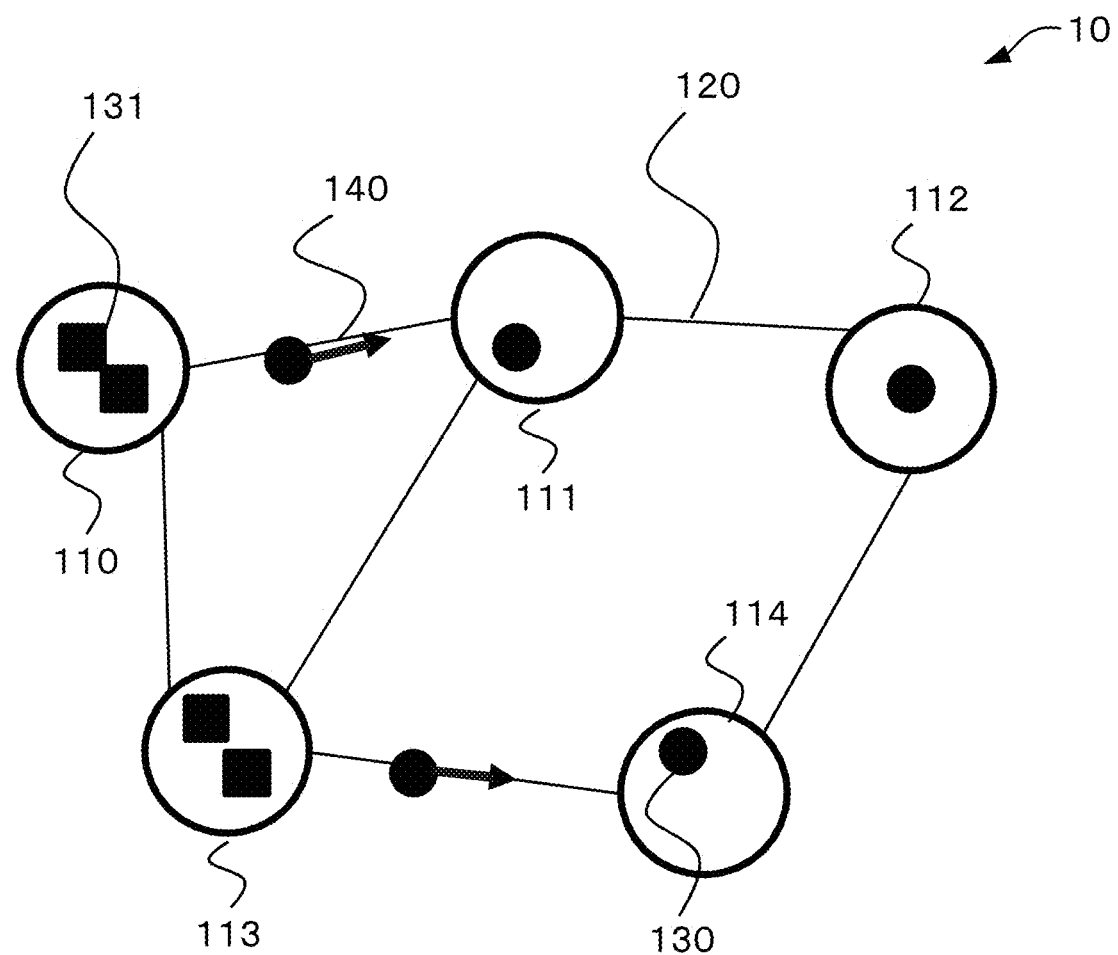
FIG. 1 is a diagram showing an example of a graph structure model as an object of analysis in a first embodiment.

Description will first be made of conceptual operation of an information processing system according to the present invention. FIG. 1 shows a conceptual diagram of a graph structure model (hereinafter a calculation model 10) as an object of analysis in the present information processing system. In this calculation model 10, calculation is performed by diffusing information elements as information units through a graph structure formed by vertices 110 to 114 and edges 120 connecting these vertices to each other, and the number of information elements on each of the vertices 110 to 114 is a solution. In addition, suppose that a calculation target in the present example is a classification problem.

Here, an information element (identifier) as a unit of information is defined. An information element is data having a state variable. The number of states in the present example is two (that is, a data capacity of one bit), and the respective states are a state u and a state v. FIG. 1 illustrates information elements 130 in the state u and information elements 131 in the state v. The information elements are diffused along edges 120 (diffusion 140 of the information elements). A result of calculation can be obtained from the numbers of information elements on each vertex. From a table 150 of the numbers of information elements on each vertex (see FIG. 2), a vertex A (vertex 110), for example, has a number of information elements (state u)=0 and a number of information elements (state v)=2, and the number of information elements (state v) is a maximum. When the state of the information elements the number of which is the maximum is made to correspond to a classification result, that is, supposing that the state u corresponds to a classification result A and that the state v corresponds to a classification result B, the vertex A belongs to the classification result B. When similar calculation is performed at each vertex, all of the vertices can be classified into either A or B.

Figure 3:
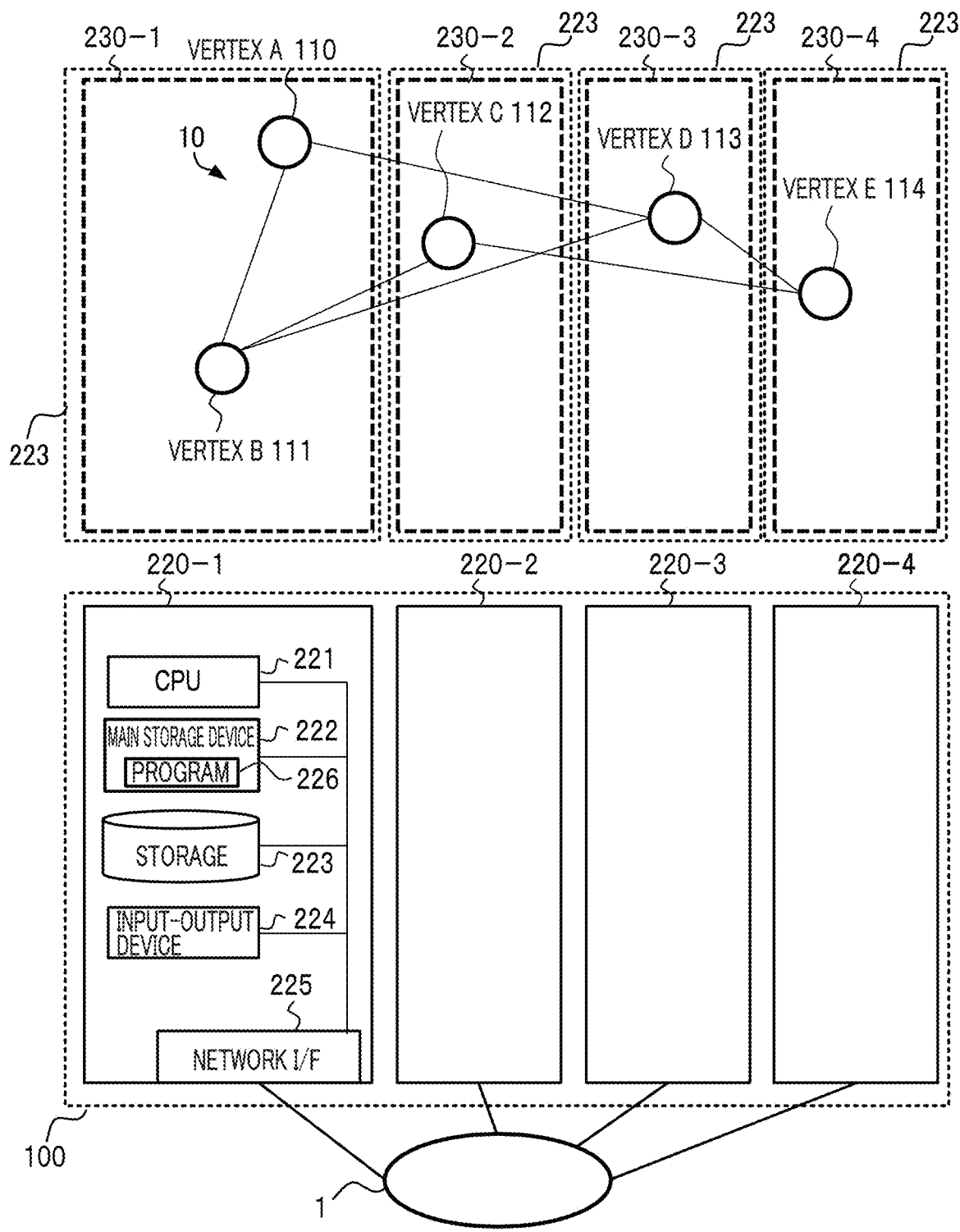
FIG. 3 is a diagram of a network configuration including an information processing system in the first embodiment.

Description will next be made of an example of configuration of an information processing system 100 in the present embodiment. FIG. 3 is a diagram showing an example of a network configuration including the information processing system 100 in the present embodiment. The information processing system 100 shown in FIG. 3 includes one or more computers 220-1 to 220-4. These computers are connected to each other by a network 1. Incidentally, the computers will hereinafter be described as computers 220 unless the computers are particularly distinguished from each other.

These computers 220 include a CPU 221, a main storage device 222 formed by a volatile storage device such as a RAM or the like, a storage 223 formed by an appropriate nonvolatile storage device such as a hard disk drive or the like, an input-output device 224 such as a keyboard, a mouse, a display, and the like, and a network I/F 225. In a computer 220 including such a configuration, the CPU 221 implements necessary functions, performs centralized control of the computer itself, and performs various kinds of determinations, operations, and control processing, by executing a program 226 retained in the main storage device 222. Hence, functions corresponding to the information processing method according to the present embodiment correspond to the functions implemented by the above-described computer 220 by executing the program 226.

Figure 4:
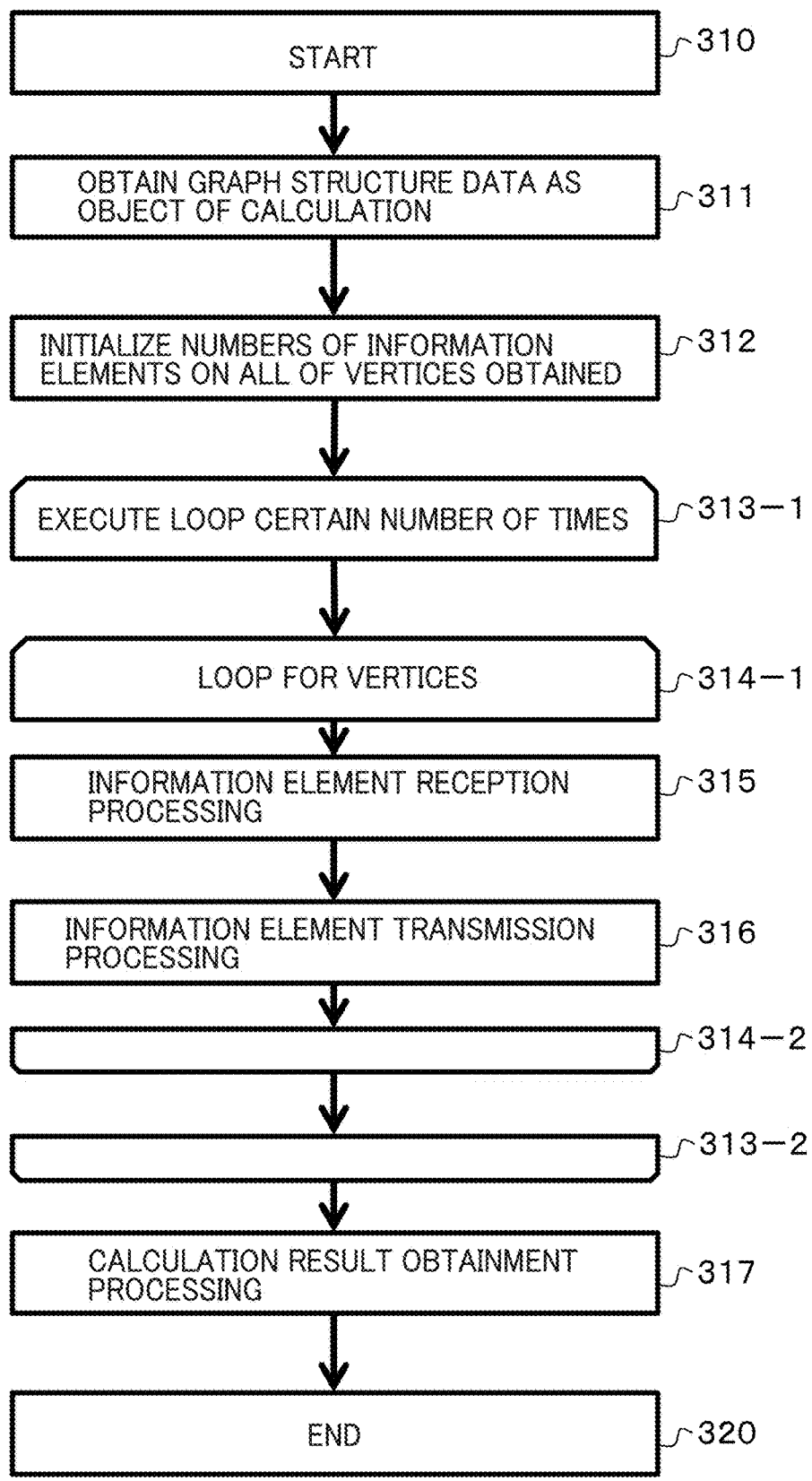
FIG. 4 is a flowchart illustrating a first procedure example in an information processing method according to the first embodiment.

An actual procedure of the information processing method in the present embodiment will next be described with reference to drawings while the calculation model of FIG. 3 described above is described again. FIG. 4 is a flowchart showing an example of a procedure in the information processing method according to the present embodiment. In this case, in first step 311, each of the computers 220-1 to 220-4 stores, in the storage 223 of the computer itself or the like, data on corresponding vertices in the above-described graph structure model 10, which vertices are arranged in a divided manner for each computer. For example, the data stored in the storage 223 by the computer 220-1 is stored in a predetermined data area 230-1 in the storage 223 as illustrated in FIG. 3, for example. Here, the graph structure model 10 similar to that of FIG. 1 is assumed, and the same reference characters are given.

The above-described data area 230-1 stores a vertex 110 as a vertex A, a vertex 111 as a vertex B, and information on the connection destinations of each vertex, that is, information indicating that the vertex 110 as the vertex A is connected to a vertex 113 as a vertex D and that the vertex 111 as the vertex B is connected to the vertex 110 as the vertex A, a vertex 112 as a vertex C, and the vertex 113 as the vertex D.

Next, in step 312, each computer 220 initializes, to numbers determined in advance, the numbers of information elements allocated to each vertex of all of the vertices included in the graph structure model 10 obtained in the above-described step 311. For example, when the numbers determined in advance for the vertex 110 as the vertex A are zero for the state u and two for the state v, the computer 220 sets the numbers of information elements assigned to the vertex A in the data retained in the storage 223 such that the number of information elements (state u) is zero and the number of information elements (state v) is two.

After the above-described step 312, each computer 220 performs loop processing (step 313-1 to 313-2) a certain number of times. Within the loop processing, each computer 220 performs loop processing (step 314-1 to 314-2) for all of the vertices whose data is obtained in the above-described step 311, and performs information element reception processing (step 315) and information element transmission processing (step 316). After completing the two pieces of loop processing (step 313 and step 314) described above, each computer 220 performs calculation result obtainment processing (step 317), and then ends the present flow.

Figure 5:
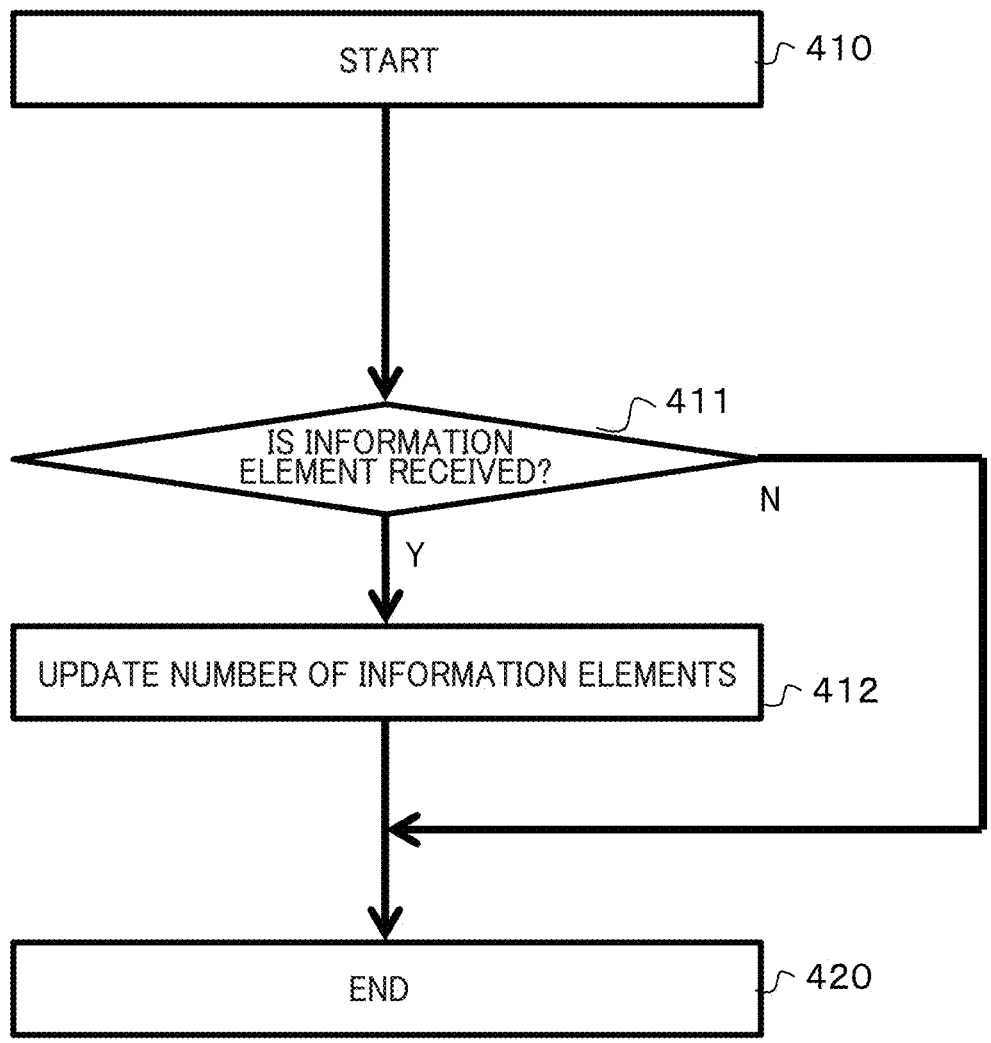
FIG. 5 is a flowchart illustrating a second procedure example in the information processing method according to the first embodiment.

Description will next be made of the reception processing (step 315), the transmission processing (step 316), and the calculation result obtainment processing (step 317) in the above-described flow. A flowchart of the reception processing (step 315) among these pieces of processing is shown in FIG. 5. After starting the flow, each computer 220 determines whether an information element is received from another vertex (step 411). When the determination sentence is true (step 411: Y), the computer 220 updates the number of information elements whose data is retained in the storage 223 (step 412). When the above-described determination sentence is false (step 411: N), the computer 220 ends the present flow.

Figure 6:
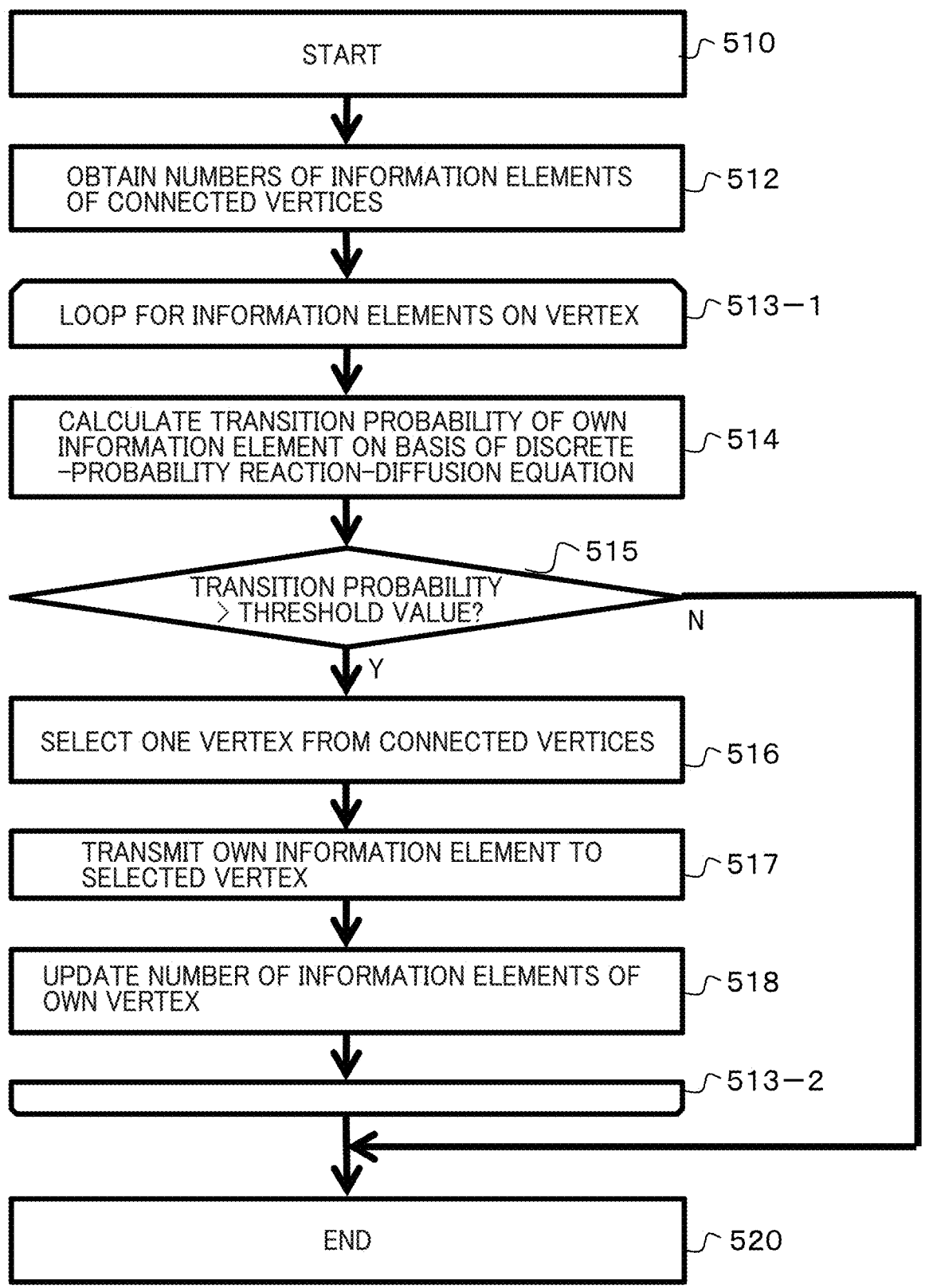
FIG. 6 is a flowchart illustrating a third procedure example in the information processing method according to the first embodiment.

In addition, a flowchart of the transmission processing (step 316) is shown in FIG. 6. After starting the flow, each computer 220 obtains the numbers of information elements on vertices connected by edges to a vertex selected in the loop processing for the vertices described above (step 314) (the connected vertex will be referred to as an adjacent vertex) (step 512). Incidentally, the numbers of information elements obtained here may be the numbers of information elements obtained in the past.

The computer 220 then performs loop processing (step 513-1 to 513-2) for the information elements on the vertex selected in the above-described step 314. The computer 220 calculates a transition probability for an information element selected in the above-described step 314 within the loop (step 514). An equation for calculating the transition probability is shown in the following as Mathematical Equation 1:

(Mathemetical Equation 1)

$$P_u = -\alpha_a f_a(N_u, N_v) + \alpha_r f_r(N_u, N_v) - \beta_a \sum_{\substack{j \in devices\ within \\ a\ vicinity\ range}} g_a(N_{uj}, N_{vj}) + \beta_r \sum_{\substack{j \in devices\ within \\ a\ vicinity\ range}} g_r(N_{uj}, N_{vj})$$

$$= -\alpha_a(N_u - N_u^2) + \alpha_r(N_v - N_u) - \beta_a \sum_{\substack{j \in devices\ within \\ a\ vicinity\ range}} \frac{N_{uj}}{N_{dj}} + \beta_r \sum_{\substack{j \in devices\ within \\ a\ vicinity\ range}} \frac{N_{vj}}{N_{dj}}$$

where Ndj is the order of a vertex j. In addition, a left side P represents the transition probability, and Pu represents the transition probability of the information element in the state u. In addition, u and v denote different states of an information element. For example, in the case of an information element assuming two states (one bit), u is a state=0, and v is a state=1. In addition, Nu and Nv denote a number of information elements. For example, Nu is the number of information elements in the state u, and Nv is the number of information elements in the state v. In addition, E of a third term and a fourth term is calculated for devices within a vicinity range. Nui and Nvj are the numbers of information elements in the respective states of a device j within the vicinity range. In addition, f and g are functions, and a and (are positive constants.

Incidentally, the computer 220 may calculate the transition probability by a prediction based on a history of update of information elements in the past. Suppose that in such a predicting method, the computer 220 is made to perform learning by a predetermined neural network in advance by using a result obtained by inputting a test pattern to the above-described Mathematical Equation 1 as correct solution data, and using the history of update of information elements in the past and the numbers of information elements of the vertex as input data, and uses a thus learned model for the calculation of the transition probability. By using the present model, the computer 220 can replace the numbers of information elements of the adjacent vertices with the history of update of information elements in the past.

Following the above-described step 514, the computer 220 in step 515 compares the transition probability calculated in the above-described step 514 with a threshold value determined in advance. Recognizing as a result that, when the threshold value is 0.5, for example, 0.5 Transition Probability≤1 (step 515: Y), that is, that the probability is high, the computer 220 advances the processing to step 516. On the other hand, when 0≤Transition Probability≤0.5, for example (step 515: N), the computer 220 recognizes that the transition probability is low, and then ends the processing (step 520).

The computer 220 in step 516 selects one vertex from the adjacent vertices whose numbers of information elements are obtained in step 512. A method for the selection in this case may be carried out in a random manner, a round robin manner, or the like. Next, the computer 220 in step 517 transmits the data (state) of the information element from the network I/F 125 to the adjacent vertex (computer corresponding to the adjacent vertex) selected in the above-described step 516. In addition, the computer 220 in step 518 updates the number of information elements of the corresponding vertex (subtracts one from the number of information elements because the information element is transmitted).

Figure 7:
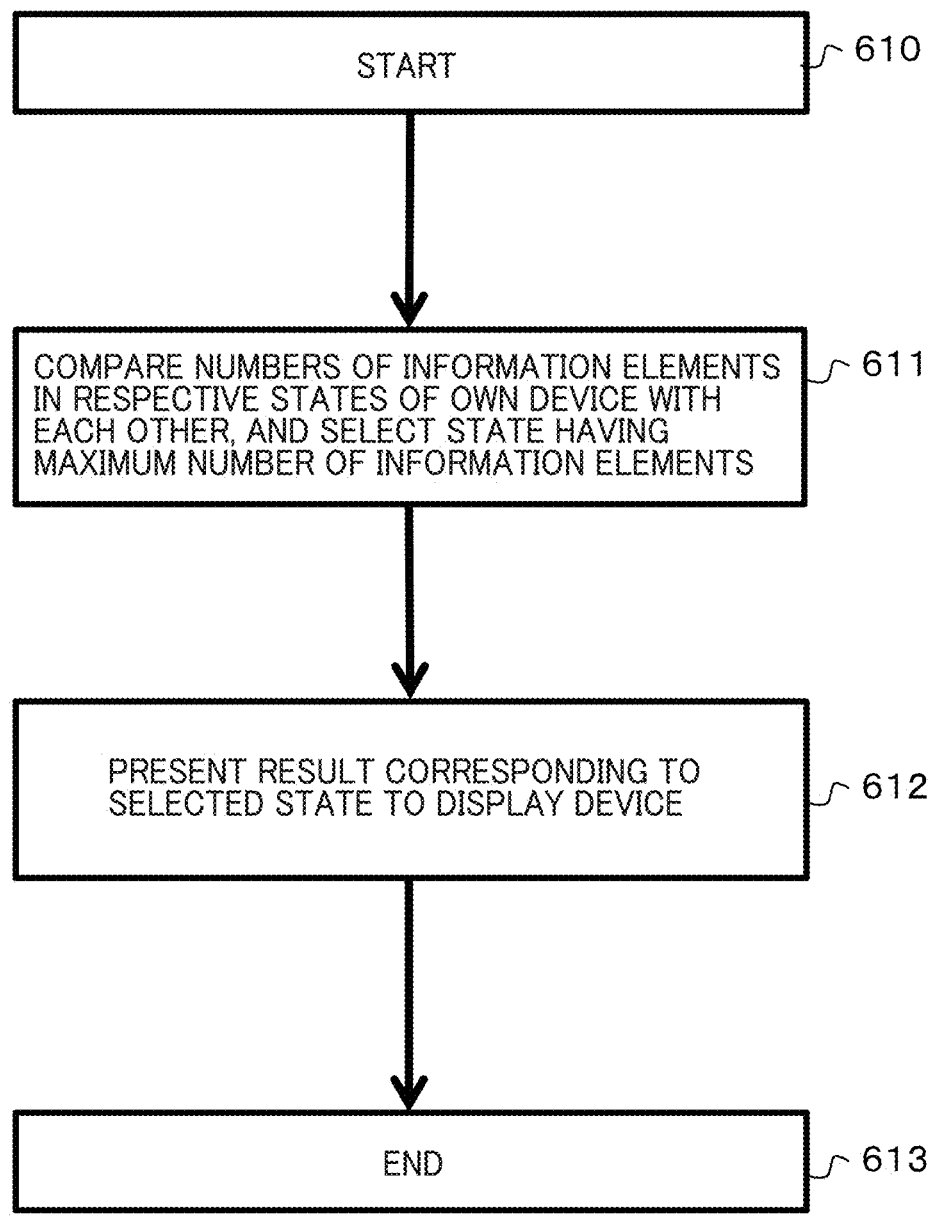
FIG. 7 is a flowchart illustrating a fourth procedure example in the information processing method according to the first embodiment.

Next, an example of a detailed flow of the calculation result obtainment processing (step 317) in the flow of FIG. 4 is shown in FIG. 7. After starting the flow, the computer 220 in step 611 compares the numbers of information elements in the respective states of each vertex, which numbers are retained in the storage 223 by the computer itself, with each other, and selects the state that has a maximum number of information elements. For example, in a case where the number of states is two (u and v), and the number of information elements in the state u on a certain vertex is one and the number of information elements in the state v on the vertex is two, the computer 220 selects the state v.

Next, the computer 220 in step 612 displays a result corresponding to the state selected in the above-described step 611 on a predetermined display device on the network 1 or the input-output device 224. For example, when the result corresponding to the state v is the classification result B, it is determined that the vertex belongs to the classification B (the state u corresponds to a community A). A similar determination is made for the other vertices.

Figure 8:
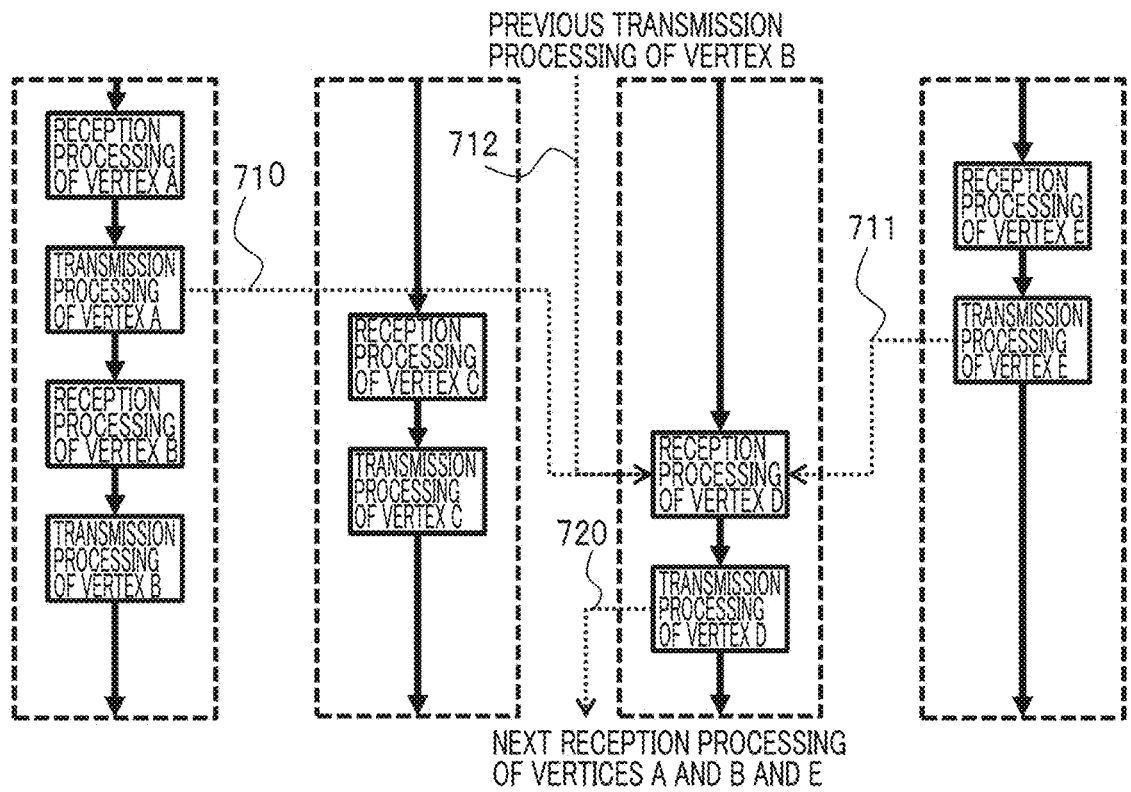
FIG. 8 is a diagram of assistance in explaining outlines of calculation order in the first embodiment.
Figure 8:
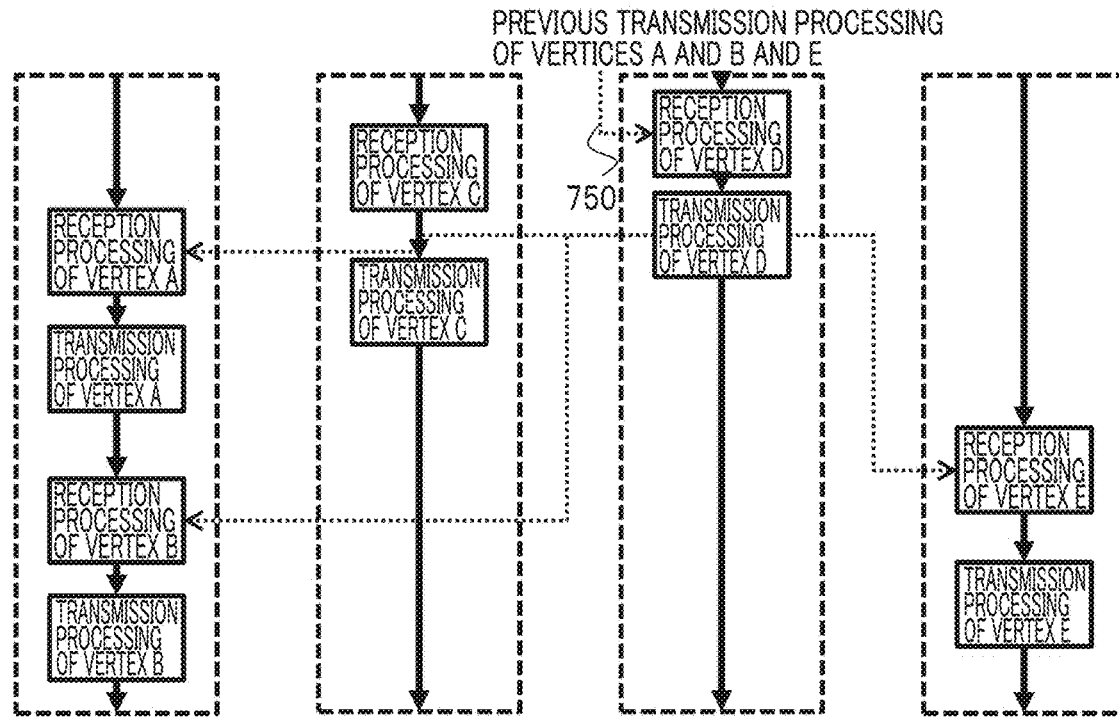

Here, as a feature of the present calculation model, the calculation result does not depend on calculation order of the information elements. In the loop for vertices (step 314-1) and the loop for information elements on a vertex (513-1) in the flow illustrated in FIG. 4 and FIG. 6, the calculation order of the vertices and the information elements is free. For example, the calculation result does not change between a case where a certain vertex A is processed and a vertex B is thereafter processed and a case where the vertex B is processed and thereafter the vertex A is processed. That is, the calculation order is free. FIG. 8 shows outlines of the calculation order when the calculation model 10 and the information processing system 100 of FIG. 3 are assumed. FIG. 8 shows two flows that are different from each other in the calculation order, and which will be described as processing order 1 and processing order 2. In addition, of data (information element) movements resulting from transmission and reception between vertices, only movements related to the vertex D are shown.

In the processing order 1, the vertex D has edges with the vertex A and the vertex B and a vertex E, and therefore movements of information elements occur between the vertices. In the calculation order 1, the transmission processing of the vertex A in the same cycle as that of the vertex D and the transmission processing of the vertex E in the same cycle as that of the vertex D are performed before the reception processing of the vertex D. However, the transmission processing of the vertex B in the same cycle as that of the vertex D is not yet performed. Therefore, in the reception processing of the vertex D, the following movements occur: a movement 710 of an information element in the same cycle from the vertex A, a movement 712 of an information element in a previous cycle from the vertex B, and a movement 711 of an information element in the same cycle from the vertex E. On the other hand, in the processing order 2, the transmission processing of the vertex A, the vertex B, and the vertex E is not performed before the reception processing of the vertex D. Therefore, a movement 750 of an information element in a previous cycle from the vertex A, a movement 750 of an information element in the previous cycle from the vertex B, and a movement 750 of an information element in the previous cycle from the vertex E occur. Thus, timing of movement of information elements differs between the processing order 1 and the processing order 2. However, calculation results in both of the processing order 1 and the processing order 2 converge to a same calculation result after processing of transmission and reception of information elements is repeated for a certain time. The above indicates that, with the present calculation model and the configuration example shown in FIG. 3, the calculation result does not change even when each computer performs calculation independently at a time of parallel calculation. Hence, processing can be performed even when the computers 220 are distributed over a wide area, and are unable to perform cooperation such as synchronization or the like due to a problem of a delay of communicating means between the computers. It is therefore possible to solve a classification problem for an object problem in which data is distributed over a wide area.

Figure 9:
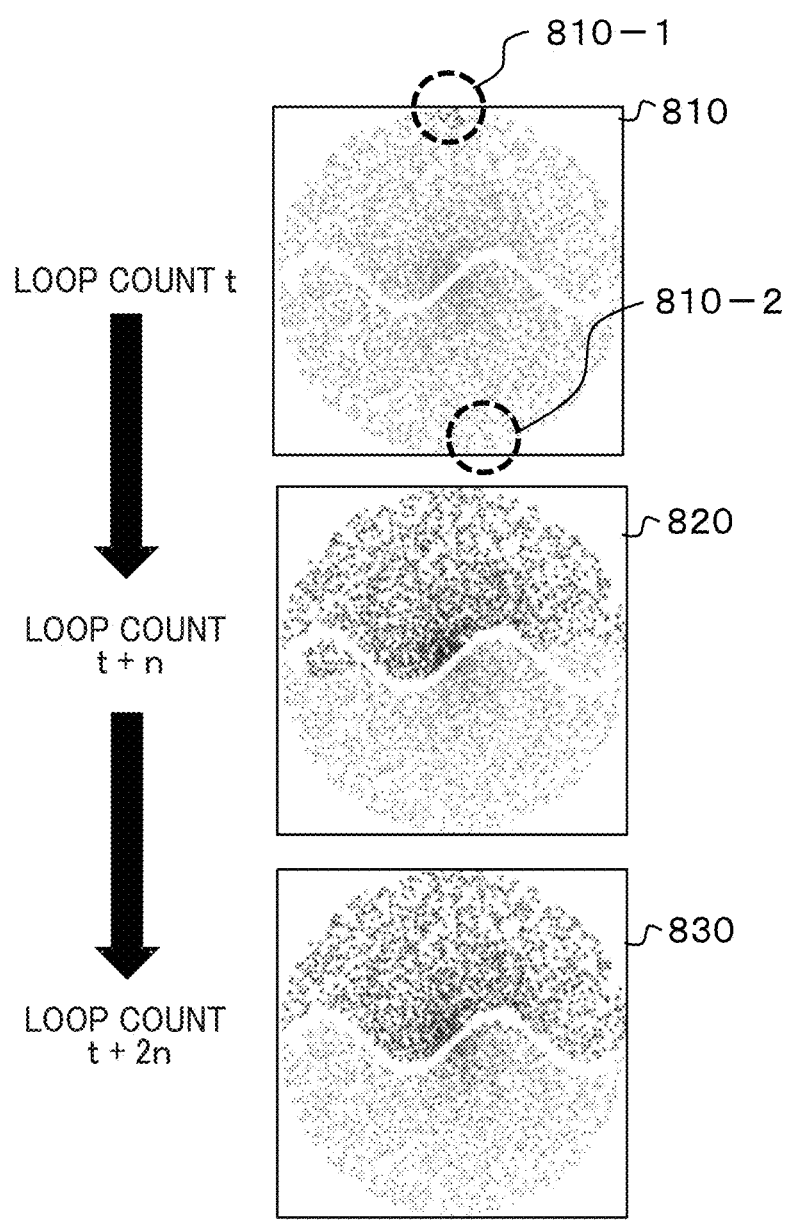
FIG. 9 is a diagram showing a more concrete calculation model example in the first embodiment.

A more concrete example is shown in FIG. 9. The example shown in FIG. 9 is a calculation model in which the number of vertices is 4096. Incidentally, FIG. 9 does not show edges because the edges make the figure complicated. In FIG. 9, a region around the center of a circle is dense with vertices, and the density of vertices is lowered toward a periphery. In addition, as for an undulating gap that traverses the circle and which has no vertices, a distance between vertices around the periphery of the circle is large than the gap around the center of the circle. Therefore, when classification according to the threshold value of distance, which is one of conventional statistical methods, is performed, the undulating gap cannot be recognized, and the classification cannot be performed correctly. On the other hand, the method according to the present invention performs classification in a manner of autonomous distribution, and can therefore correctly recognize the gap in the high-density region around the center and the gap in the low-density region around the periphery. Suppose that in the calculation model shown in FIG. 9, the number of states of information elements is two, and 4096×8 information elements (state u) are allocated to a vertex group 810-1 and 4096×8 information elements (state v) are allocated to a vertex group 810-2 in the initialization of the numbers of information elements. In addition, at each vertex in FIG. 9, thickness (color thickness from white through gray to black) shown in the figure is varied between a case where there are a large number of information elements in the state u and a case where there are a large number of information elements in the state v.

In a state 810 with a loop count t in FIG. 9, information elements are only diffused through a part of an upper end of graph structure data and a part of a lower end of the graph structure data. However, in a state 820 with a loop count t+n, the information elements are spread throughout. However, in the above-described state with the loop count t+n, classification accuracy is decreased in the vicinity of the gap in the center of the graph structure data. On the other hand, neat classification is performed in a state 830 with a loop count t+2n.

Second Embodiment

A case where each edge defined in the calculation model of the first embodiment retains a weight coefficient will next be described as a second embodiment. In the present second embodiment, delay processing based on the weight coefficient of each edge is added to the transmission processing shown in the first embodiment. The computer 220 therefore has a delay device that performs the corresponding processing.

Figure 10:
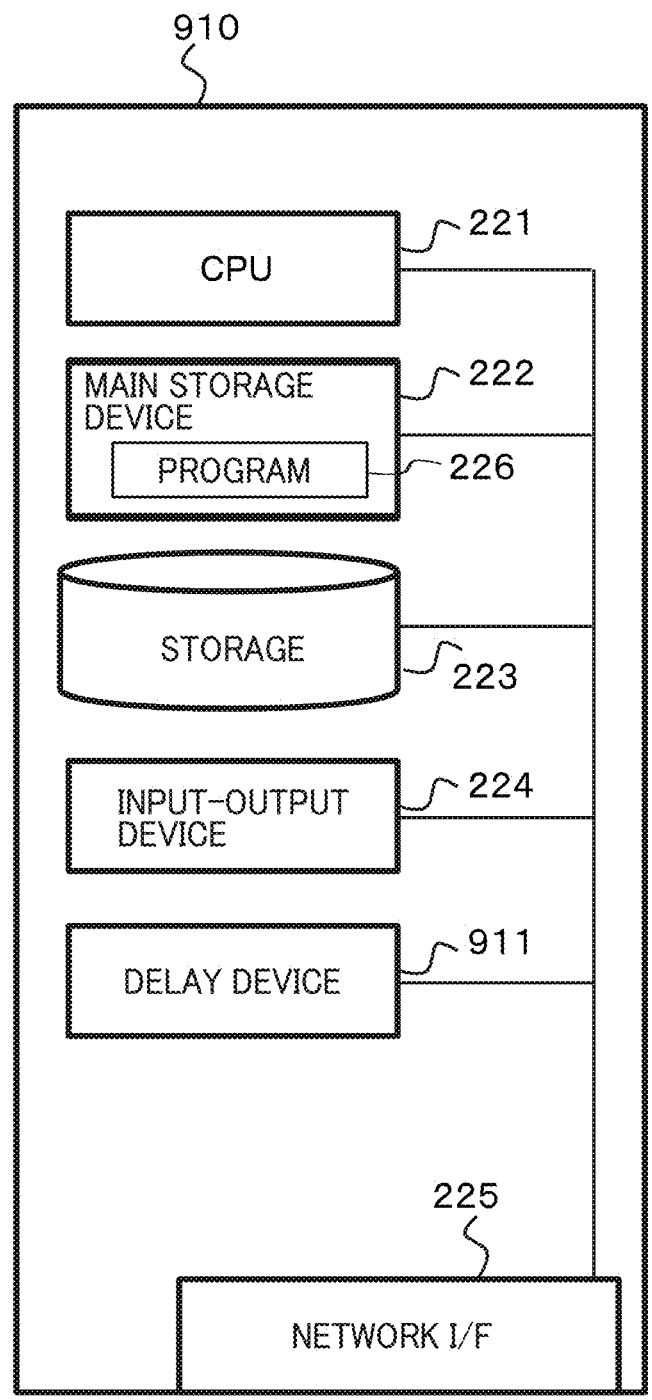
FIG. 10 is a diagram showing an example of configuration of a computer in an information processing system according to a second embodiment.

An example of configuration of a computer 910 in an information processing system in this case is as shown in FIG. 10. The computer 910 shown in this case corresponds to each of the computers 220-1 to 220-4 shown in FIG. 3. Modules having the same functions are identified by the same reference characters. The computer 910 in the second embodiment is newly provided with a delay device 911 as compared with the computers 220-1 to 220-4.

Figures 11, 12:
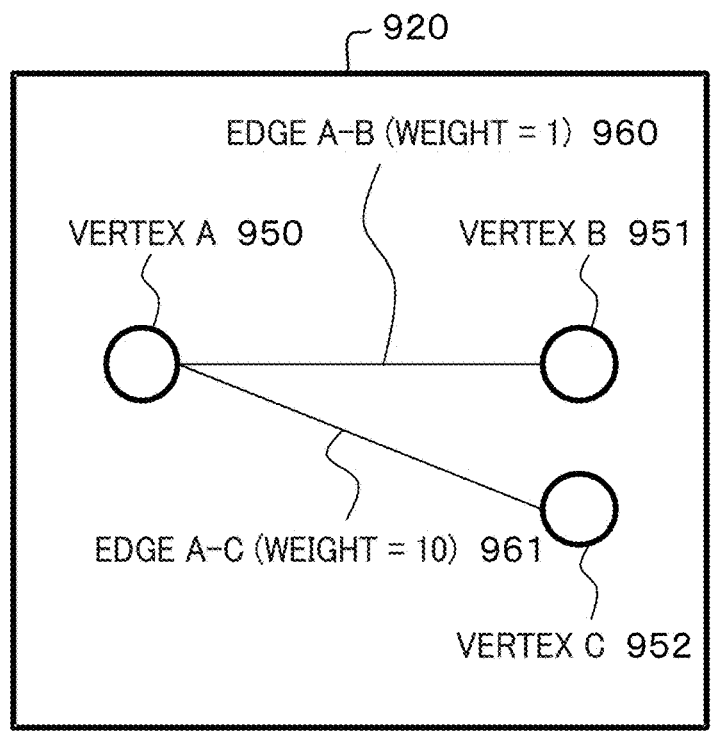
FIG. 11 is a diagram showing graph structure data in a case where edges in a calculation model in the second embodiment have a weight.
FIG. 12 is a diagram showing a table of relation between the weights of the edges and delay times in the second embodiment.
Figure 13:
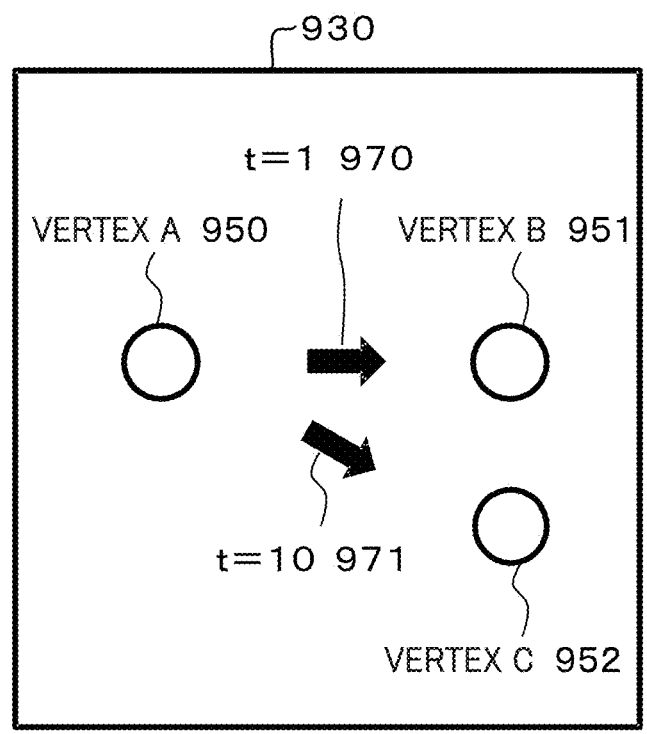
FIG. 13 is a diagram showing an example of transition times of information elements in the second embodiment.

On the basis of this, graph structure data 920 in the case where edges in the calculation model have a weight is shown in FIG. 11. Suppose that the graph structure data 920 includes a vertex A 950, a vertex B 951, and a vertex C 952, that an edge between the vertices A and B has a weight 960 whose value is one, and that an edge between the vertices A and C has a weight 961 whose value is 10. When an information element moves from the vertex A 950 to the vertex B 951 in the graph structure data 920, the computer 910 delays the transition of the information element by the delay device 911 according to the above-described weight 960. FIG. 12 shows a table 940 defining relation between the weights of such edges and delay times. The computer 910 controls the transition time of an information element. A transition time 930 of an information element as shown in FIG. 13, for example, when the information element moves from the vertex A 950 to the vertex B 951 is a delay time t=1 (970) because the weight is one. Similarly, when an information element moves from the vertex A 950 to the vertex C 952, the weight is 10 (961), and therefore the delay time is t=10 (971). The relation between the weights and the delay times may be given by the table 940 in advance as in FIG. 12, or may be calculated by the computer 910 using a predetermined mathematical equation determined in advance or the like.

Third Embodiment

Description will next be made of an example of an information processing system having a function of automatically obtaining graph structure data on the basis of activities in the real world at the time of step 311 in the flow of FIG. 4 which flow is shown in the first embodiment, that is, the graph structure data obtainment processing. In a concept in this case, graph structure data as a calculation model is not calculated on the information processing system, but activities in the real world are used as they are.

Figure 14:
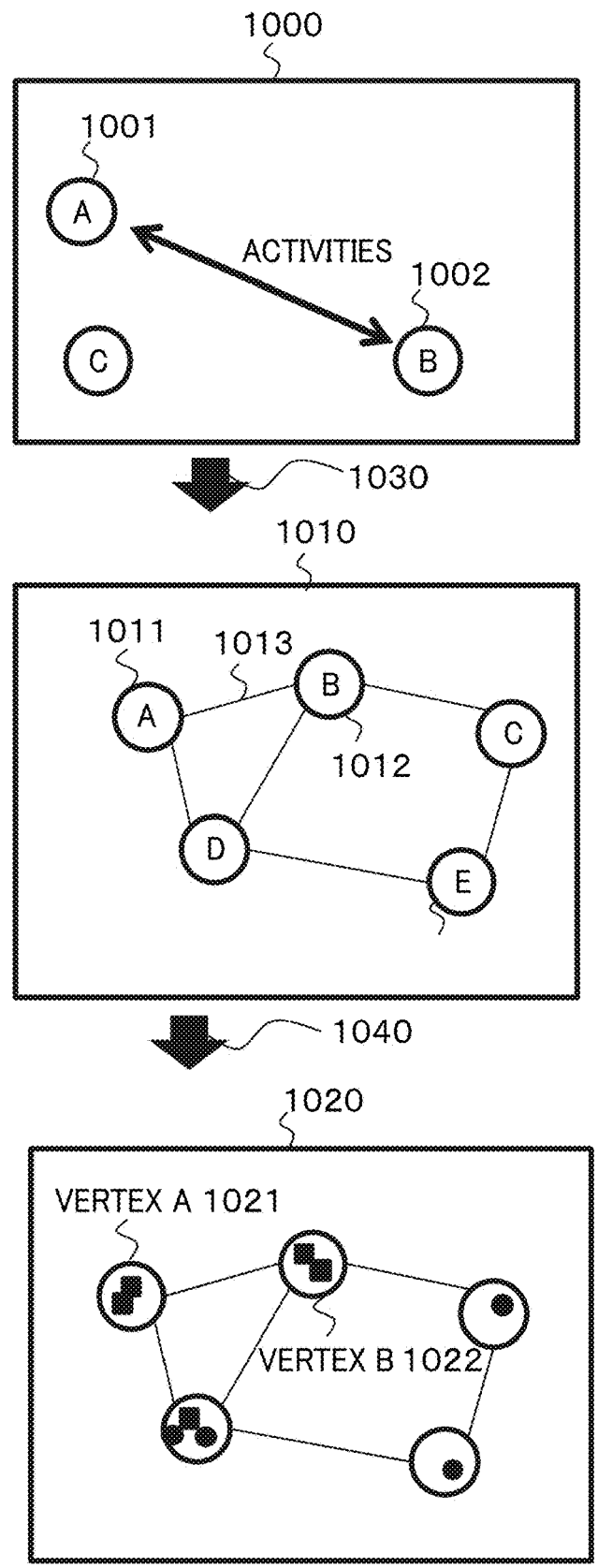
FIG. 14 is a diagram showing a first example of a concept of obtaining graph structure data based on activities in the real world in a third embodiment.

A concrete example thereof is shown in FIG. 14. When conversation between humans is assumed as activities in the real world, for example, in FIG. 14, graph structure data as a calculation model is structured from a log of the conversation between the humans (log indicating who and who had conversation how many times and for how long).

When a person A (1001) and a person B (1002) have conversation in activities (1000) in the real world, for example, the computer 220 that has obtained the recorded data generates an edge 1013 between a vertex A (1011) corresponding to the above-described person A and a vertex B (1012) corresponding to the person B as graph structure data 1010 expressing the frequency and time of the conversation. The computer 220 thus performs structuring 1030. Of course, the activities in the real world are not limited to conversation between persons, but may be activities between a thing and a thing (for example communication between machines such as robots, automobiles, signals, or the like), activities between a person and a thing, activities between things via a person (indirect communication between places or facilities via a person making rounds of a plurality of facilities or racks), interaction between SNS users in a virtual space (message communication, electronic mail, or the like), and the like. The computer 220 in this case structures the activities in the real world into graph structure data, and then analyzes the graph structure data as in the processing illustrated in the first embodiment.

Figure 15:
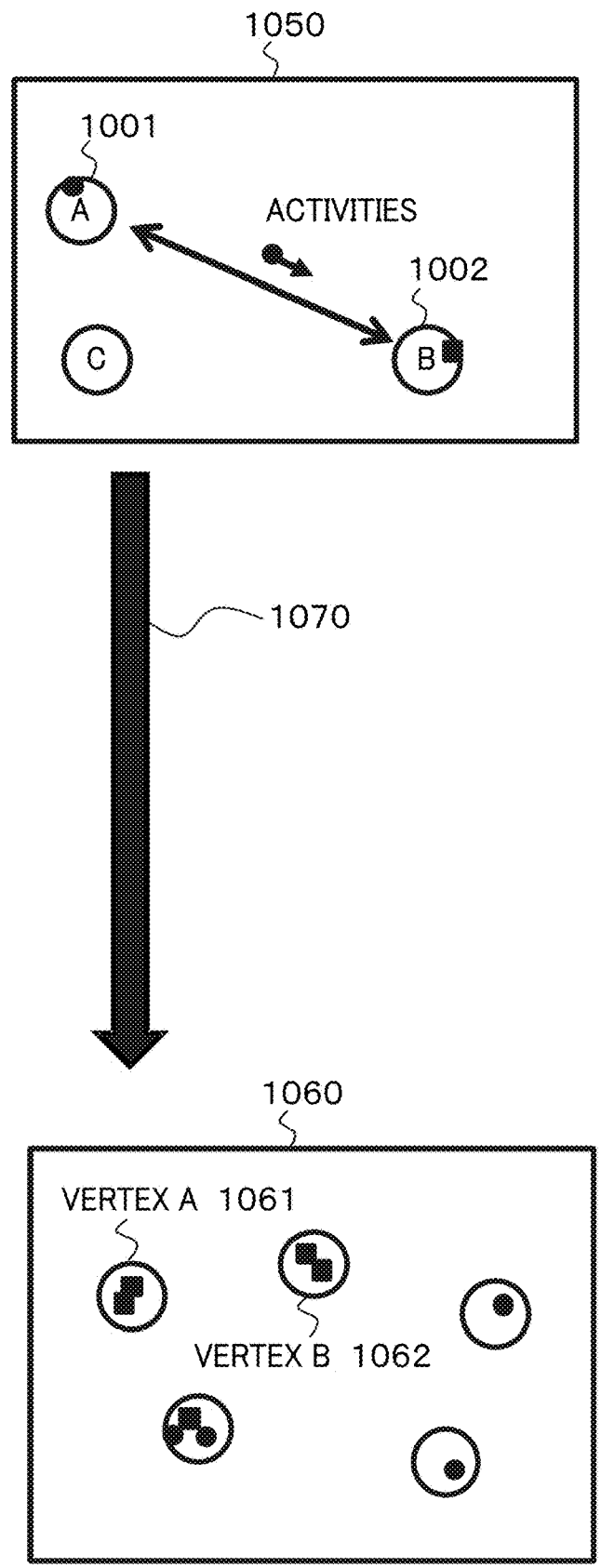
FIG. 15 is a diagram showing a second example of the concept of obtaining the graph structure data based on the activities in the real world in the third embodiment.

On the other hand, when information elements are made to accompany the activities in the real world as input data when the graph structure data is structured, it is possible to perform calculation using the input data itself in structuring the graph structure data. FIG. 15 shows a state 1050 in which information elements are exchanged so as to accompany the activities in the real world. When the person A and the person B described above can retain information elements, and the information elements can be updated at a time of conversation between the person A and the person B, the computer 220 performs calculation 1070 using the activities in the real world, and obtains the numbers of information elements retained in the real world, that is, between the person A and the person B, as an analysis result 1060, which is a result of the calculation. Concrete configurations corresponding to the present concept will be described in a third to a sixth embodiment.

Figure 16:
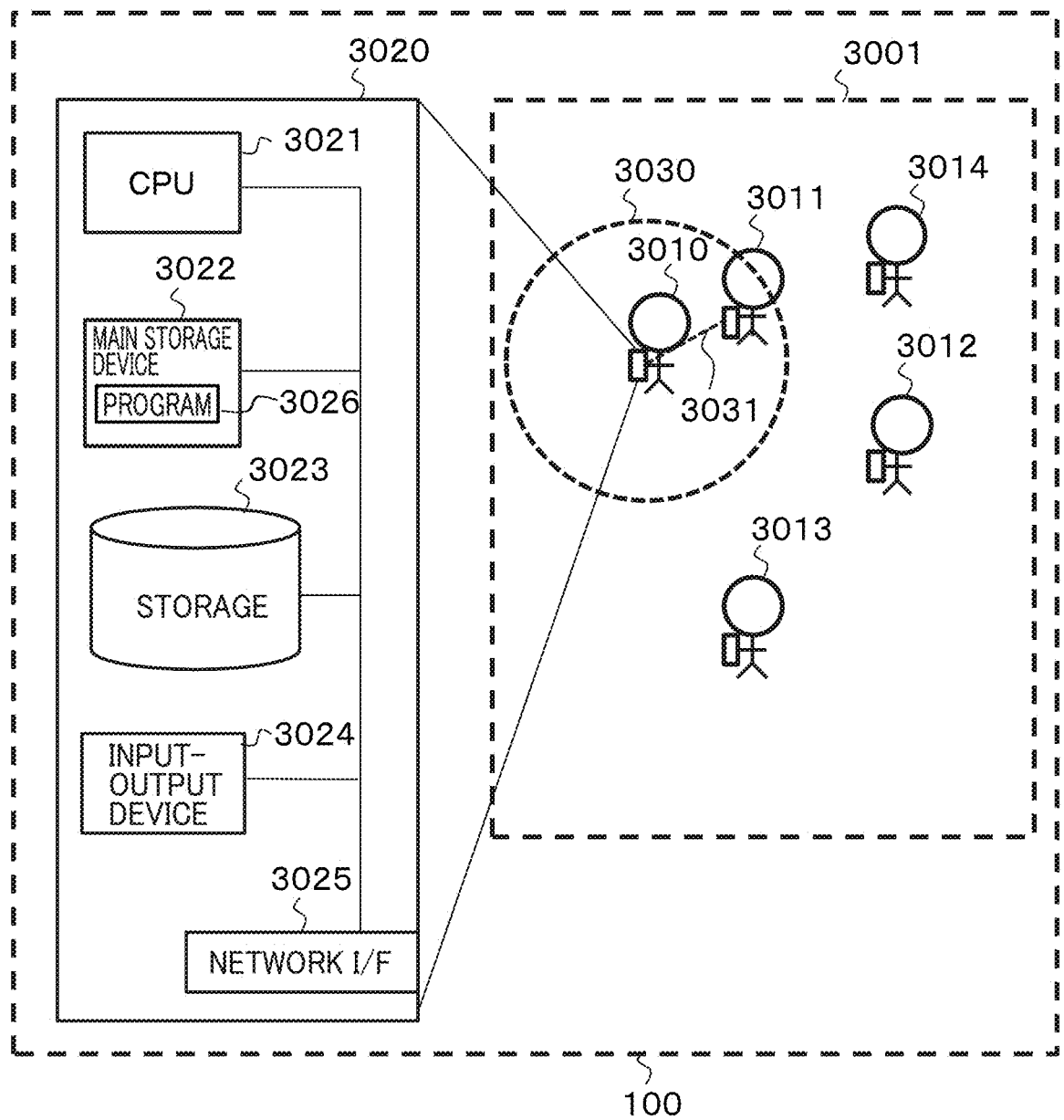
FIG. 16 is a diagram showing an example of configuration of an information processing system in the third embodiment.

A configuration of an information processing system in such a third embodiment will be described in the following. FIG. 16 shows an example of configuration of the information processing system 100 in the present third embodiment. The information processing system 100 illustrated here includes a device group 3001 and devices 3020 retained or implemented on vertices. Suppose in the present example that the information processing system having the real world as a processing object is described as an example, that the device group 3001 is a collection of people in the real world, and that each device is a smart device possessed by a person or the like. Of course, the device group is not limited to people, but may be moving bodies such as vehicles or the like, smart phones accompanying machines, apparatuses such as embedded computers or the like, or programs accompanying data. Suppose that a problem as an object of analysis is a vertex group classification problem. In a case where each vertex is a person, the vertex group classification problem is applied to detection of communities of certain groups, for example.

The device 3020 as a computer in this case includes a CPU 3021, a main storage device 3022 retaining a program 3026, a storage 3023, an input-output device 3024, and a network I/F 3025. In addition, suppose that the device 3020 has a vicinity range 3030 recognized as a range in which communication can be performed. In the example of FIG. 16, the vicinity range 3030 is a circle having, as a center thereof, the device 3010 accompanying a person or an apparatus, and having, as a radius thereof, a value determined in advance. Such a vicinity range 3030 can be calculated from a physical distance between devices. However, the vicinity range 3030 may be a reachable range of a radio wave transmitted by the network I/F 3025 or the like or a range in which the frequency of communication between devices (that is, between vertices possessing the devices), for example the number of times of exchange of email or the like, is equal to or more than a certain threshold value.

In addition, the device 3020 can communicate within the vicinity range 3030 using the network I/F 3025 or the like. In the example of FIG. 16, a vertex 3010 has a function of communicating with another device 3011 present within the vicinity range 3030. The device present in the vicinity range 3030 corresponds to a vertex connected by an edge as illustrated in the first embodiment. Therefore activities in the real world themselves constitute an edge. That is, the graph structure data in the first embodiment is rendered unnecessary. In addition, in the present third embodiment, the device 3020 will be referred to as a vertex.

Figure 17:
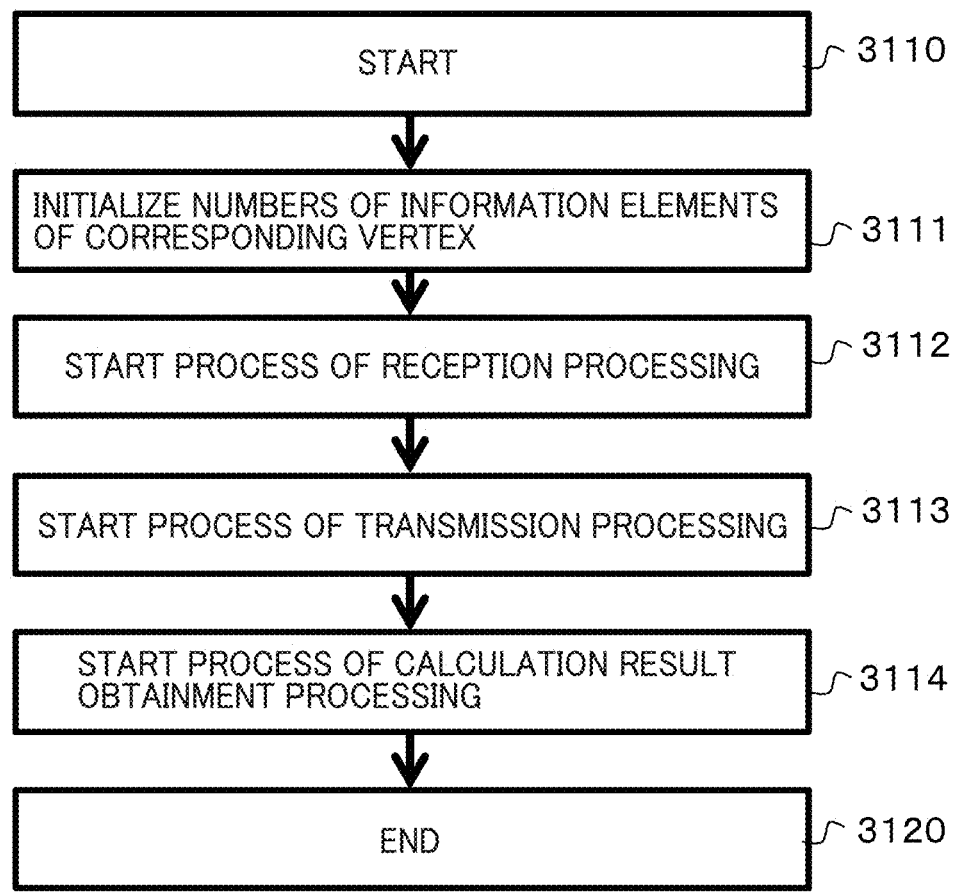
FIG. 17 is a flowchart illustrating a first procedure example in an information processing method according to the third embodiment.

An example of a processing procedure of an information processing method in the present third embodiment will next be described. FIG. 17 is a flowchart showing the processing procedure in the information processing method according to the present third embodiment. In this case, an information element as a unit of information is similar to that defined in the first embodiment.

In this case, after starting the flow, each device 3020 first initializes the numbers of information elements of the corresponding vertex (step 3111). As details of the processing of step 3111, the device 3020 initializes the numbers of information elements to numbers determined in advance. For example, when the numbers determined in advance for the vertex A are zero for the state u and two for the state v, the device 3020 sets the numbers of information elements assigned to the vertex A such that the number of information elements (state u) is zero and the number of information elements (state v) is two. Thereafter, the device 3020 starts a process of reception processing in step 3112, and starts a process of transmission processing in step 3113.

Next, the device 3020 in step 3114 starts a process of calculation result obtainment processing. The device 3020 may perform the process of the reception processing (step 3112), the process of the transmission processing (step 3113), and the process of the calculation result obtainment processing (step 3114) in parallel with each other.

Figure 18:
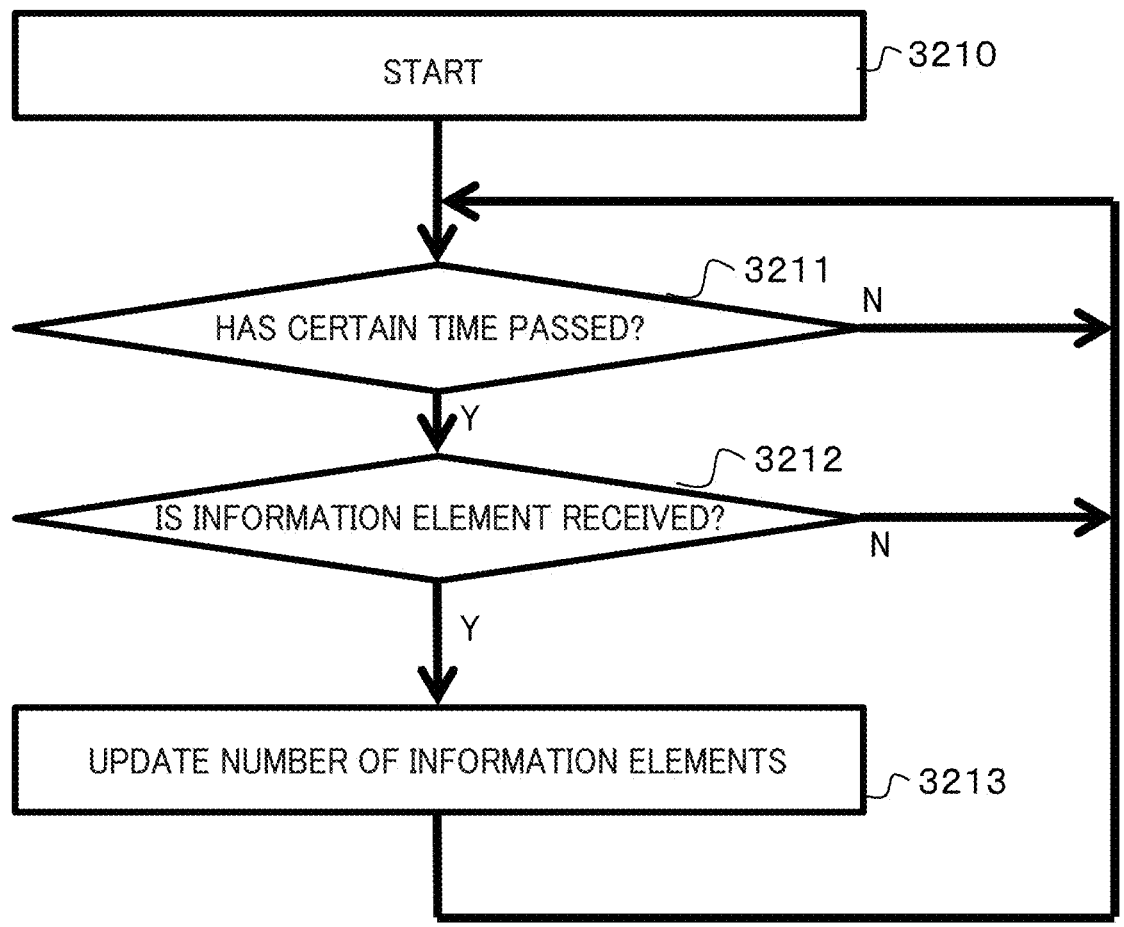
FIG. 18 is a flowchart illustrating a second procedure example in the information processing method according to the third embodiment.

The following description will be made of the process of the reception processing (step 3112) among the above-described processes. A main difference of the reception processing in the present third embodiment from the reception processing in the first embodiment is the addition of processing depending on the passage of a fixed time. FIG. 18 shows a flowchart of the process. After starting the process, the device 3020 in step 3211 determines whether a time determined in advance has passed. When the determination sentence is true (step 3211: Y), the device 3020 shifts the processing to step 3212.

In addition, the device 3020 in step 3212 determines whether an information element is received from another device. When the determination sentence is true (step 3212: Y), the device 3020 updates the number of information elements of the own device in step 3213. The process is terminated by a termination interrupt or the like. In addition, the processing may be triggered by communication rather than the passage of the fixed time.

Concrete description will next be made of the process of the transmission processing (step 3113) mentioned above. A main difference of the transmission processing in the present third embodiment from the transmission processing in the first embodiment is the addition of processing depending on the passage of a fixed time.

Figure 19:
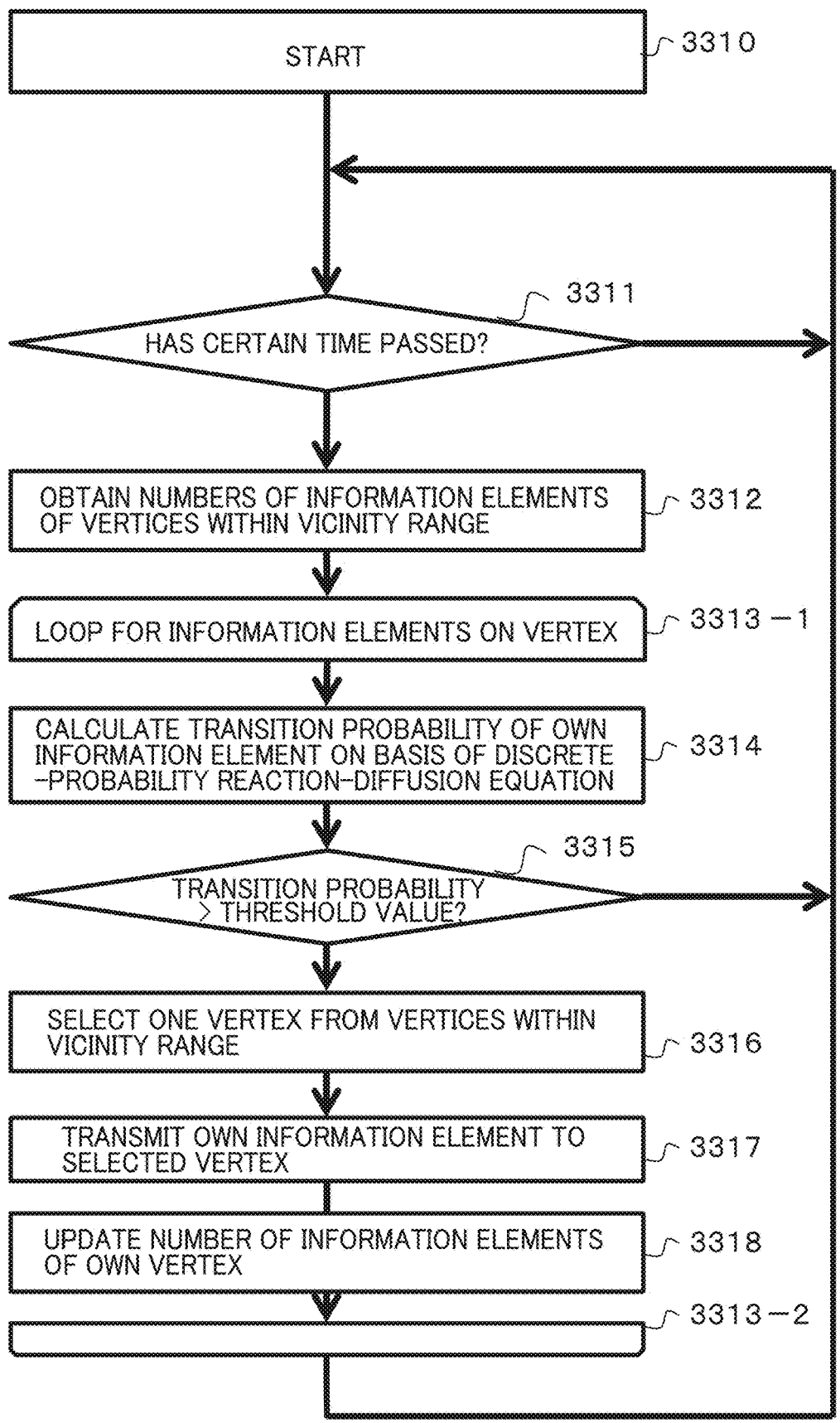
FIG. 19 is a flowchart illustrating a third procedure example in the information processing method according to the third embodiment.

FIG. 19 shows a flowchart of the process. After starting the process, the device 3020 in step 3311 determines whether a time determined in advance has passed. When the determination sentence is true (step 3311: Y), the device 3020 shifts the processing to step 3312. The device 3020 in step 3312 communicates with vertices present within the above-described vicinity range 3030 to obtain the numbers of information elements retained by the vertices.

Subsequent steps 3313-1 to 3313-2 are loop processing for each information element of the own vertex. In step 3314 in the loop processing, the device 3020 calculates the transition probability of the own information element. The step is similar to the processing of step 514 in the first embodiment.

Thereafter, the device 3020 in step 3315 compares the transition probability calculated in the above-described step 3314 with a threshold value determined in advance. When the determination sentence is true as a result of the comparison (step 3315: Y), the device 3020 advances the processing to step 3316. For example, when the threshold value is 0.5, and 0≤Transition Probability<0.5, the device 3020 advances the processing to step 3311. When 0.5≤Transition Probability≤1, on the other hand, the device 3020 advances the processing to step 3316.

The device 3020 in step 3316 selects one vertex from the vertices within the vicinity range 330. A method for the selection may be carried out in a random manner, a sequential manner, or the like. Thereafter, the device 3020 in step 3317 transmits the data (state) of the own information element from the network I/F 3025 to the vertex (device of the vertex) selected in the above-described step 3316. In addition, the device 3020 updates the number of information elements of the own vertex in step 3318 (subtracts one from the number of information elements because the information element is transmitted). In addition, parameters of these pieces of processing (for example the coefficients of the calculation equation for the transition probability, the threshold value, the selecting method, and the like) may differ between the vertices.

Figure 20:
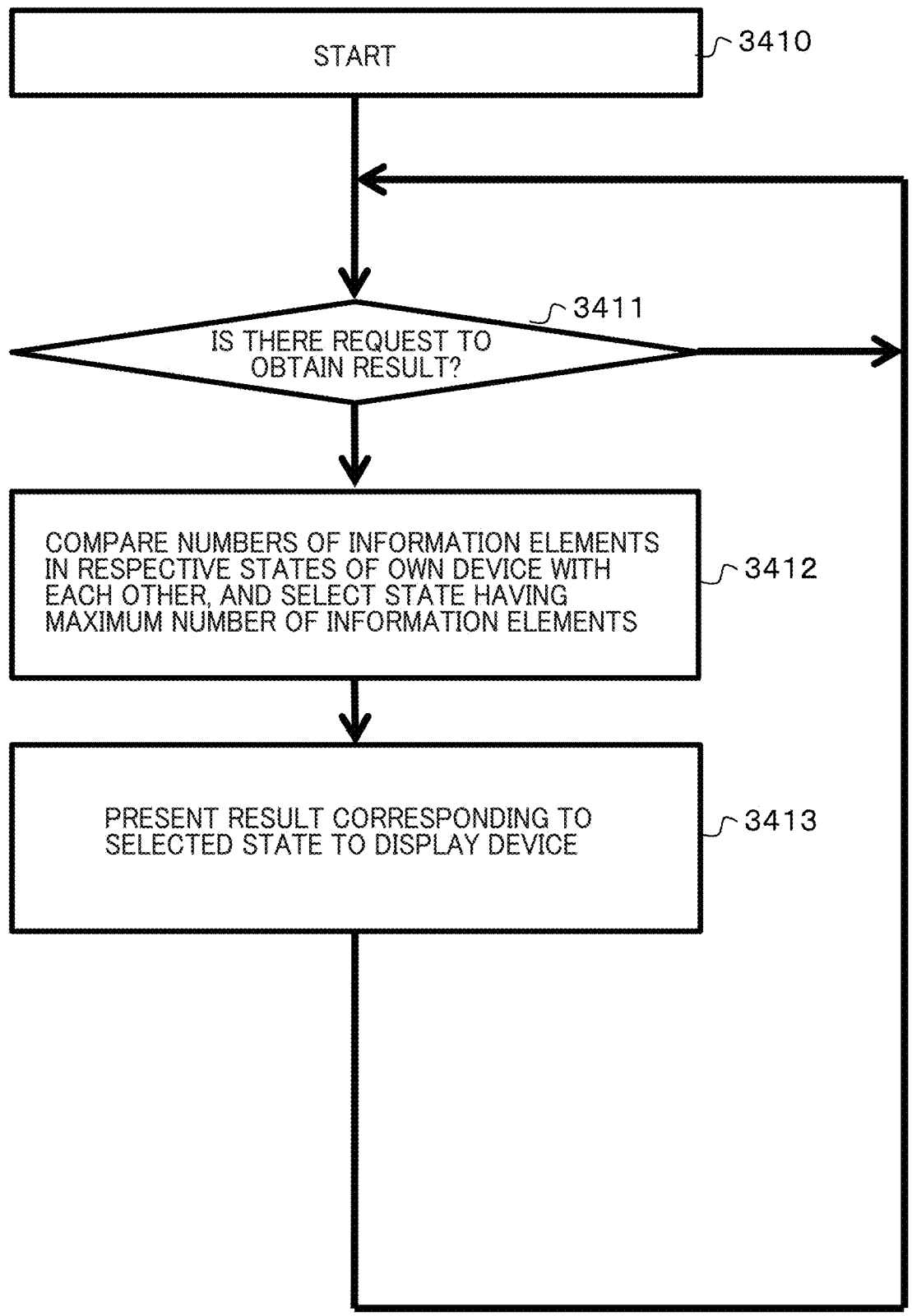
FIG. 20 is a flowchart illustrating a fourth procedure example in the information processing method according to the third embodiment.

The process of the calculation result obtainment processing (step 3114) mentioned above will next be described concretely. FIG. 20 shows a flowchart of the calculation result obtainment processing. In this case, after starting the calculation result obtainment processing, the device 3020 in step 3411 determines whether there is a request to obtain a result from the input-output device 3024. When this determination is true (step 3411: Y), the device 3020 performs step 3412 and step 3413. The steps are respectively similar to step 611 and step 612 of the first embodiment, and therefore description thereof will be omitted.

The above processing solves the classification problem for the vertices as in the first embodiment. The vertices in the third embodiment are devices distributed in the real world, that is, the classification problem for the devices distributed in the real world can be solved efficiently without graph structure data being generated.

Fourth Embodiment

A fourth embodiment will next be illustrated as an example of an information processing system corresponding to a calculation model in which each vertex in the foregoing third embodiment is data, and edges between vertices are continuity of access between pieces of data. The present fourth embodiment provides a method of efficiently arranging data necessary for processes in computers when the plurality of processes are processed on the plurality of computers.

Figure 21:
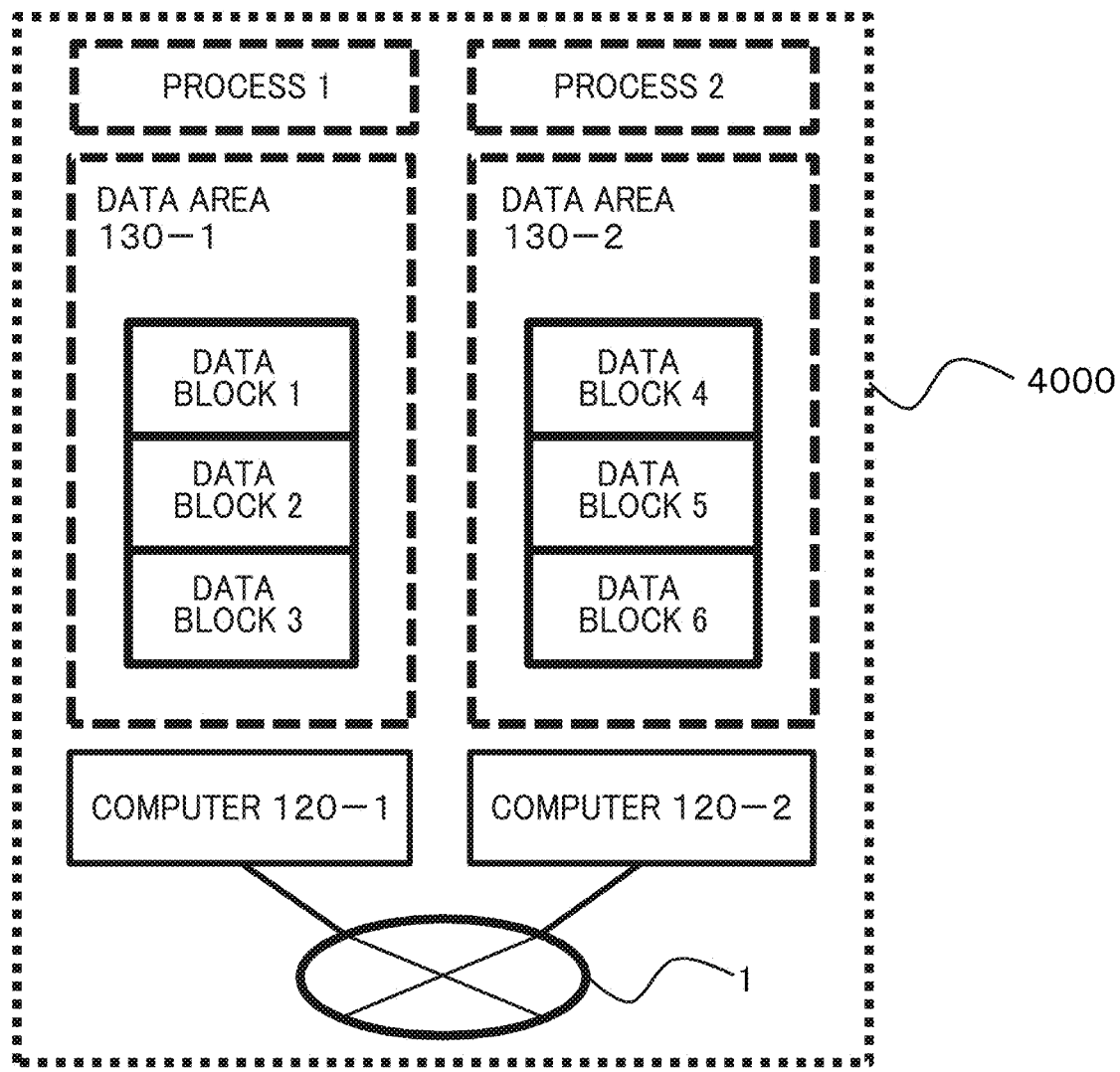
FIG. 21 is a diagram showing an example of configuration of an information processing system in a fourth embodiment.

Suppose that in an information processing system 4000 illustrated in FIG. 21, a computer 120-1 and a computer 120-2 are connected to each other by a network 1, that the computer 120-1 processes a process 1, and that a data area 130-1 of the computer 120-1 stores data blocks 1, 2, and 3. In addition, suppose that the computer 120-2 processes a process 2, and that a data area 130-2 of the computer 120-2 stores data blocks 4, 5, and 6. In addition, the above-described data blocks store data necessary for the above-described processes 1 and 2.

Figure 22:
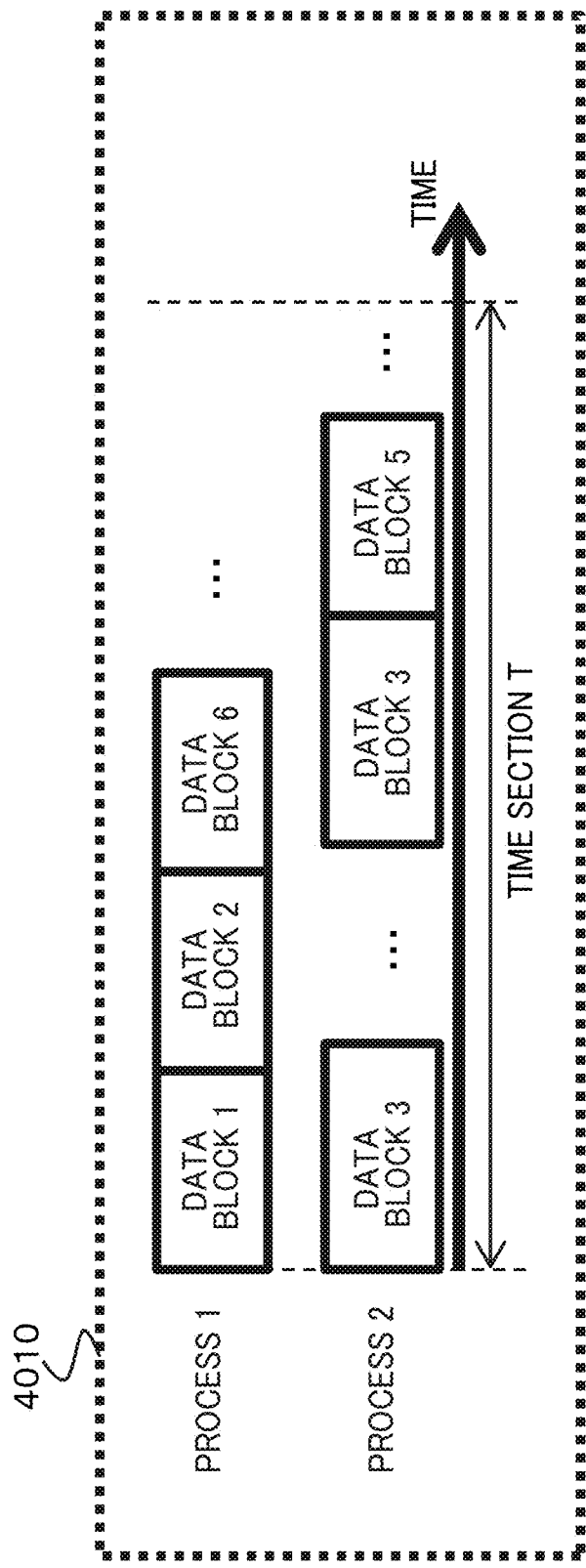
FIG. 22 is a diagram showing an example of a chart of access to data blocks by processes in the fourth embodiment.

FIG. 22 shows an example of a chart 4010 of access to data blocks of such respective processes 1 and 2. In the access chart 4010 illustrated in FIG. 22, data blocks adjacent to each other in a time direction in a time section T are judged to have relation to each other. Specifically, in a case where the process 1 accesses the data block 1 and then continues to access the data block 2, the relation between the data block 1 and the data block 2 is incremented by one.

Figure 23:
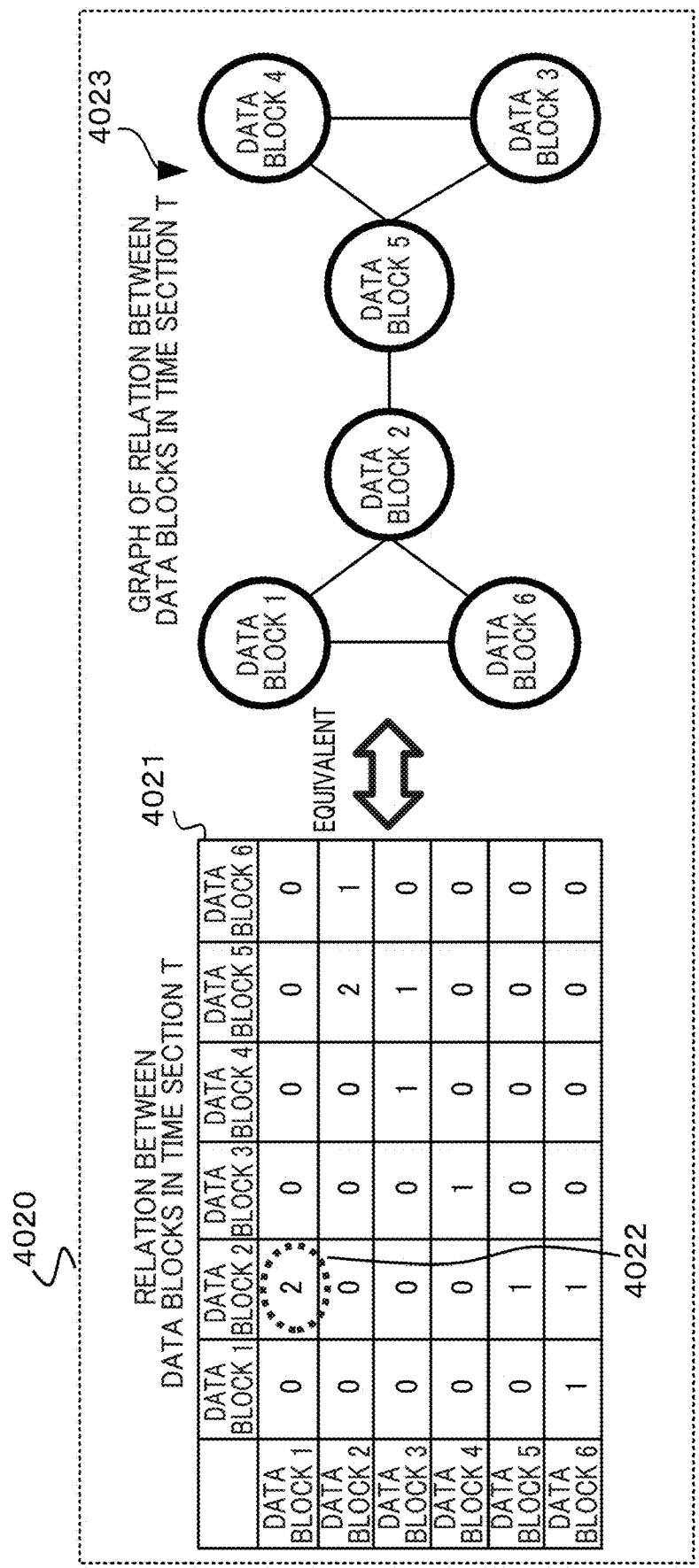
FIG. 23 is a diagram showing an example of process relation in the fourth embodiment.

FIG. 23 shows an example of relations 4020, which are calculated by thus adding up the relations of each process. In a table 4021 in FIG. 23, "2" as a value (4202) of the row of the data block 1 and the column of the data block 2 indicates that a number of times of access to the data block 2 which access is made successively after access to the data block 1 in the above-described time section T is "2." In addition, a relation graph 4023 is obtained when the relation table 4021 in FIG. 23 is represented by a graph. The graph 4023 does not indicate edges whose numbers of times are "0." This result shows that the data blocks 1, 2, and 6 should preferably be stored in the data area of the processing computer of the process 1, that is, the data area (130-1), and that the data blocks 3, 4, and 5 should preferably be stored in the data area of the processing computer of the process 2, that is, the data area (130-2).

Figure 24:
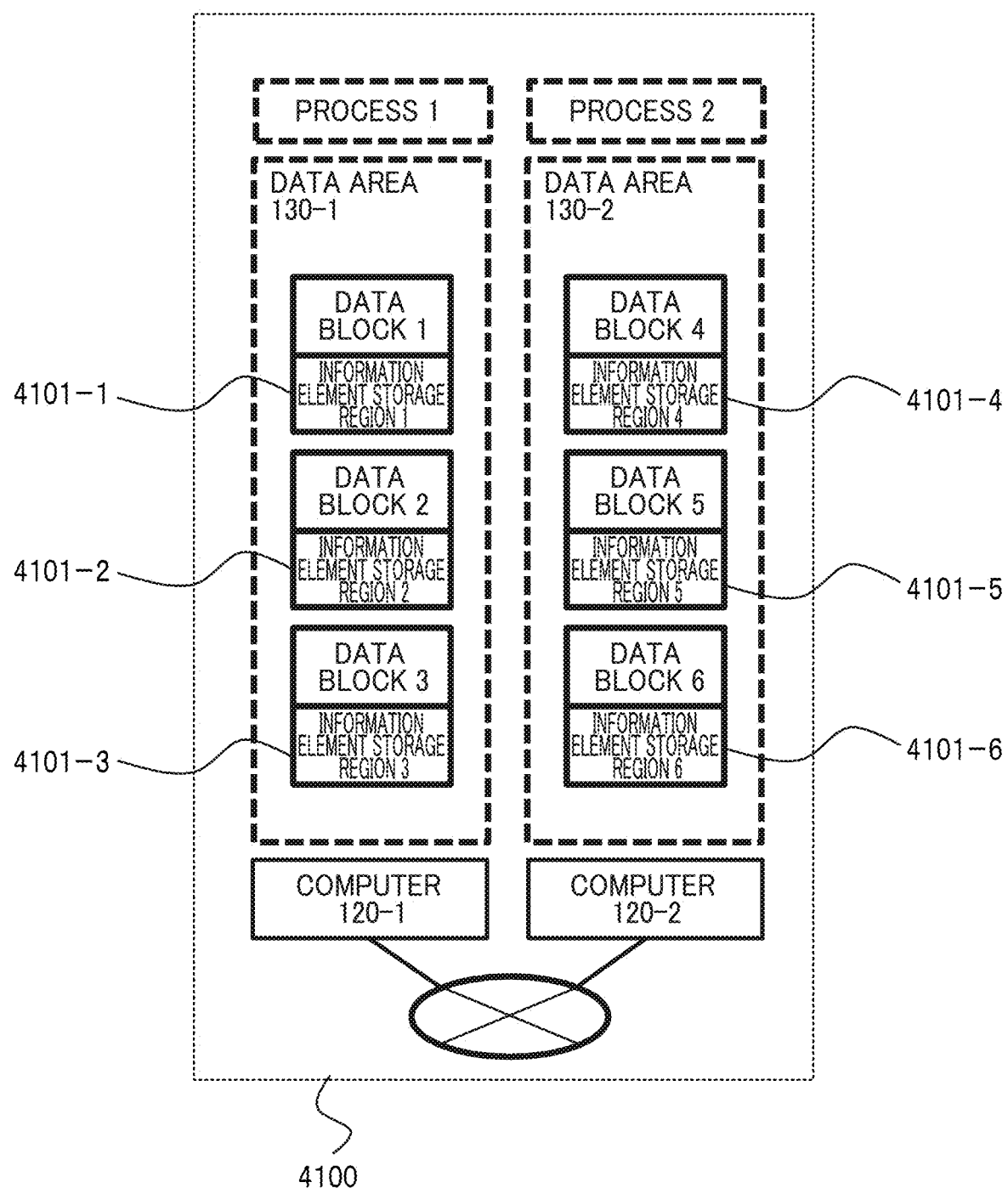
FIG. 24 is a diagram showing an outline of an information processing system in the fourth embodiment.

FIG. 24 is a schematic diagram of an information processing system 4100 in the present fourth embodiment. The diagram of the information processing system 4100 shows the configuration of the data areas of the information processing system 4000 in FIG. 21 in more detail. The information processing system 4100 has information element storage regions 1 to 6 (4101-1 to 4101-6) corresponding to respective data blocks in the respective data areas 130-1 and 130-2. The storage regions have a function of storing one or more information elements.

Figure 25:
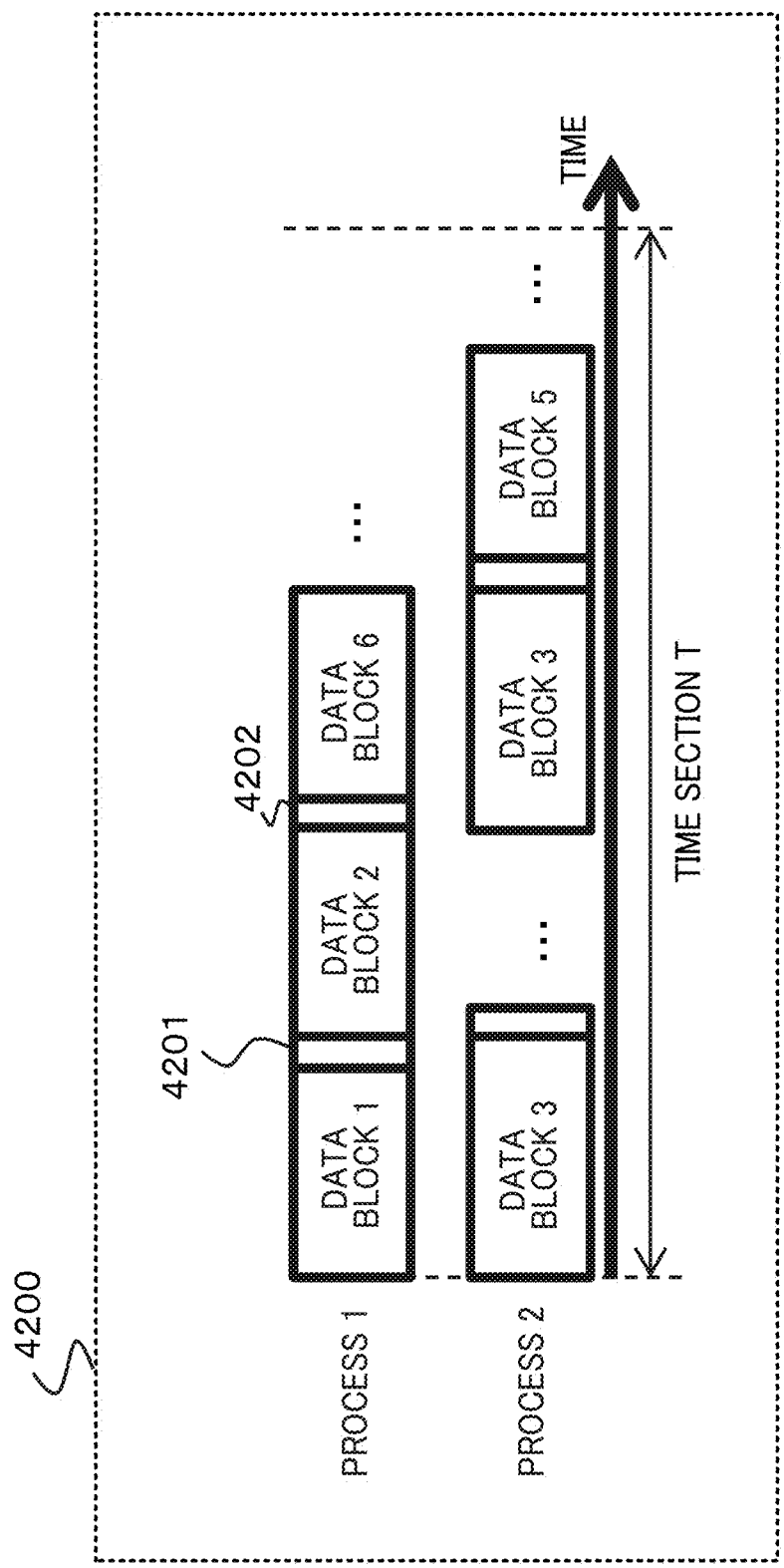
FIG. 25 is a diagram showing an example of a chart of access by processes in the fourth embodiment.
Figure 26:
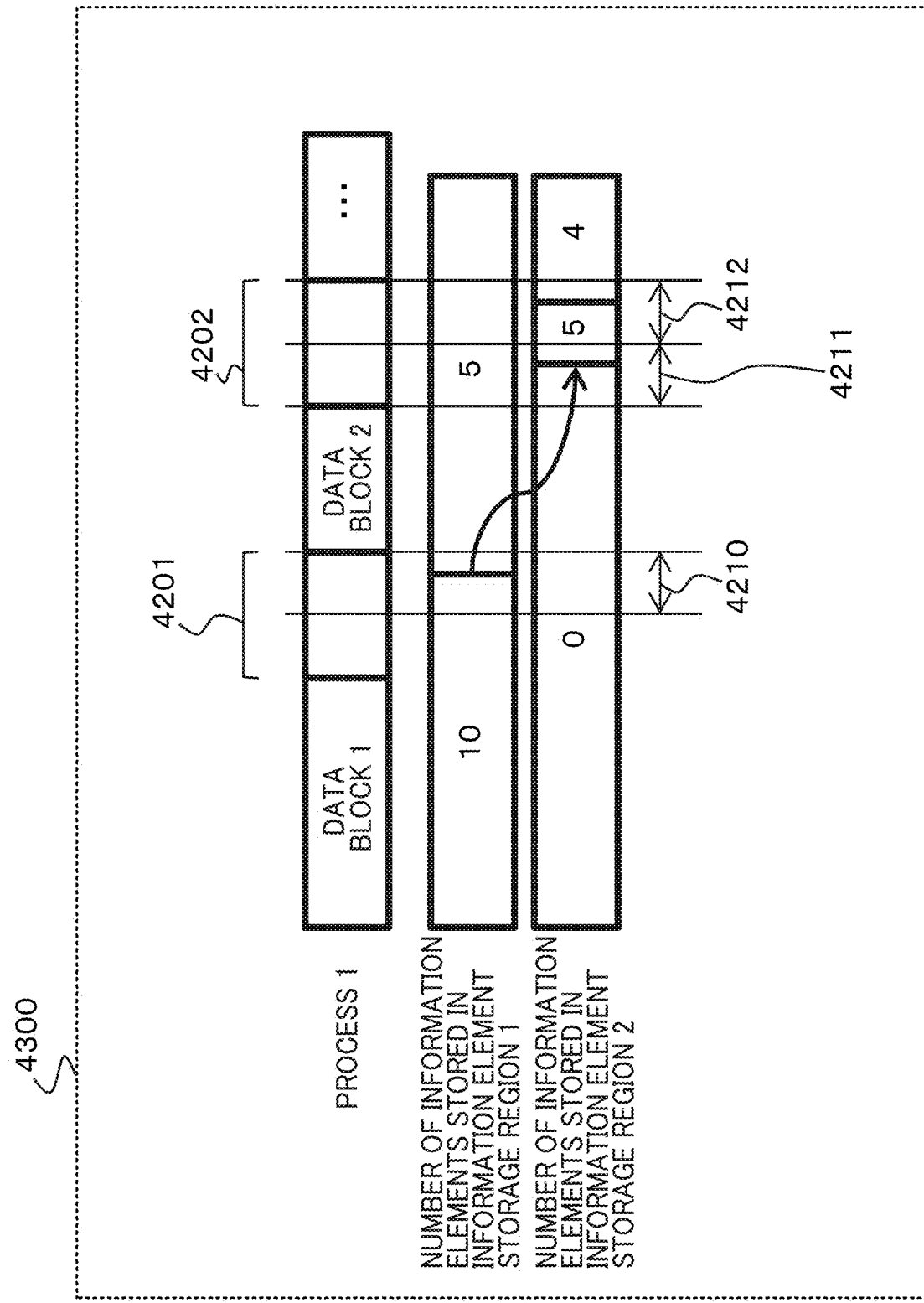
FIG. 26 is a diagram showing an example of processing on information element storage regions corresponding to data blocks in the fourth embodiment.

An information processing method according to the present fourth embodiment will next be described. FIG. 25 is a chart 4200 of access of each process. Suppose in the present fourth embodiment that processing is performed on the information element storage regions corresponding to respective data blocks at times of access to the respective data blocks. An example 4300 of the processing is shown in FIG. 26. In this case, when the process 1 accesses the data block 1, information elements stored in the information element storage region 1 are obtained as processing 4201 on the region 1. That is, the number of information elements is subtracted. In the example, the number of information elements is 10 before the processing, whereas five information elements stored in the above-described region 1 are obtained in the processing 4210 (the number of information elements is 10−5=5). Thereafter, the process 1 accesses the data block 2, and thus performs processing 4202 on the information element storage region 2 corresponding to the above-described data block. In the present processing, the five information elements obtained in the preprocessing 4201 are added to the region 2 (4211). Then, the processing further obtains an information element from the region (4212). Information elements are circulated between the storage regions corresponding to the respective data blocks by repeating such processing. Data blocks having high degrees of relation (data blocks that tend to be accessed successively) are classified into a same cluster according to the distribution of information elements. Data blocks having high degrees of relation can be gathered in a same computer when data blocks are moved between data areas of computers periodically according to the distribution of information elements.

Figure 27:
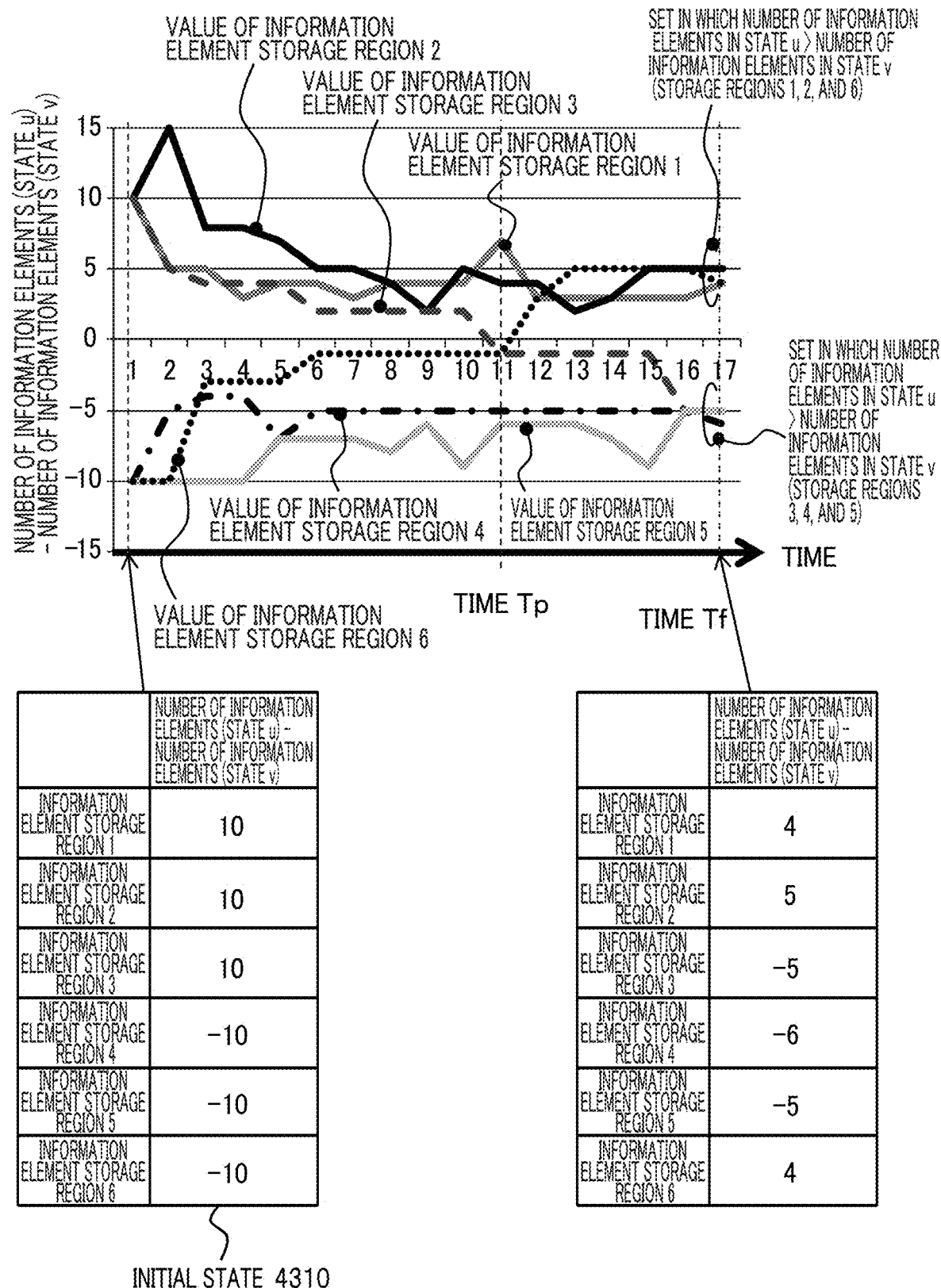
FIG. 27 is a diagram showing an example of temporal changes in the numbers of information elements stored by the respective information element storage regions in the fourth embodiment.

An example of calculation of the present fourth embodiment will be illustrated next. FIG. 27 shows temporal changes in the numbers of information elements stored in the respective information element storage regions 1 to 6. In addition, a table 4310 in FIG. 27 shows an initial state of the numbers of information elements stored in the respective information element storage regions. In the present example, the number of states of an information element is two (the state u and the state v), and the numbers of information elements that make the above-described temporal changes and which are shown in the table 4310 are calculated by an equation: the number of information elements in the state u minus the number of information elements in the state v. In addition, suppose that in the initial state, the number of information elements u is 10 and the number of information elements v is zero (the number of information elements u minus the number of information elements v is 10) in the regions 1 to 3 in the data area 130-1, and the number of information elements u is zero and the number of information elements v is 10 (the number of information elements u minus the number of information elements v is −10) in the regions 4 to 6 in the data area 130-2. The number of information elements in each of the regions is updated each time the data block is accessed, and temporally changes as in FIG. 27.

Directing attention to time Tp in FIG. 27, the magnitude relation between the numbers of states of information elements in the storage region 3 and the storage region 6 is inverted. Therefore, a cluster of the regions 1 to 3 and a cluster of the regions 4 to 6 in the initial state change into a cluster of the regions 1, 2, and 6 and a cluster of the regions 3, 4, and 5 at time Tf. This represents a desirable data block arrangement described above with regard to the relations 4020 between the data blocks in FIG. 23.

Fifth Embodiment

Figure 28:
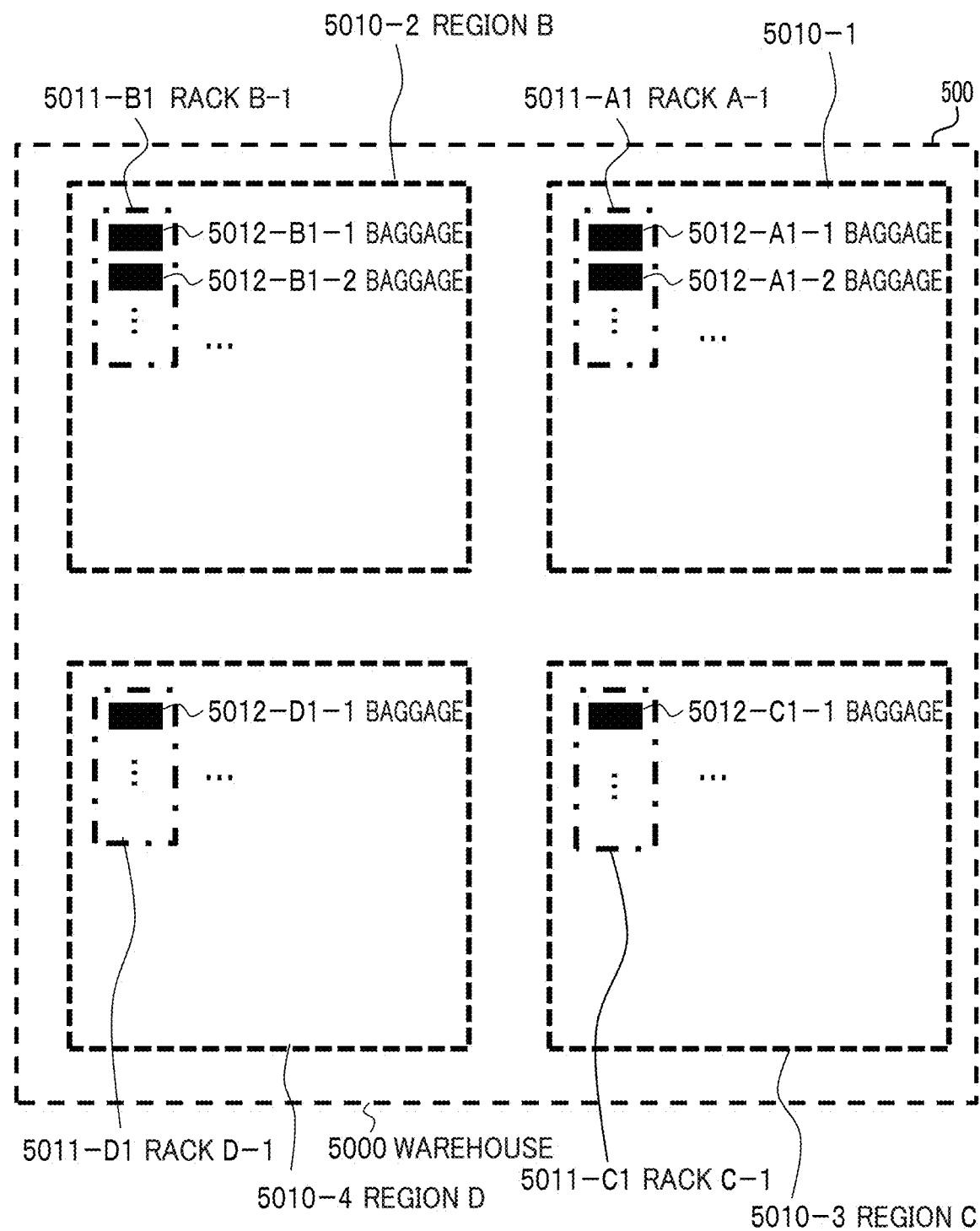
FIG. 28 is a diagram showing an example of configuration of a warehouse in a fifth embodiment.

An information processing method that is related to baggage pickup work in a warehouse and which deals with a problem of rearranging racks within the warehouse so as to shorten the distance of a line of flow of a worker performing the work will next be illustrated as a fifth embodiment. FIG. 28 illustrates a configuration of a warehouse 500 of interest. The warehouse 500 has a plurality of regions. The warehouse 500 in FIG. 28 has four regions A (5010-1) to D (5010-4). A plurality of racks are arranged within each of these regions A to D. In the example of FIG. 28, a rack 5011-A1 is shown as one rack placed in the region A (5010-A). However, suppose that a plurality of other racks are arranged in the region A (5010-A). As with the region A, the regions B to D are provided with a plurality of racks. Further, a plurality of pieces of baggage can be placed in each rack. In the example of FIG. 28, pieces of baggage 5012-A1-1 and 5012-A1-2 are shown arranged in the rack A-1 (5011-A1). A plurality of pieces of baggage can be similarly arranged in the other racks.

Figure 29:
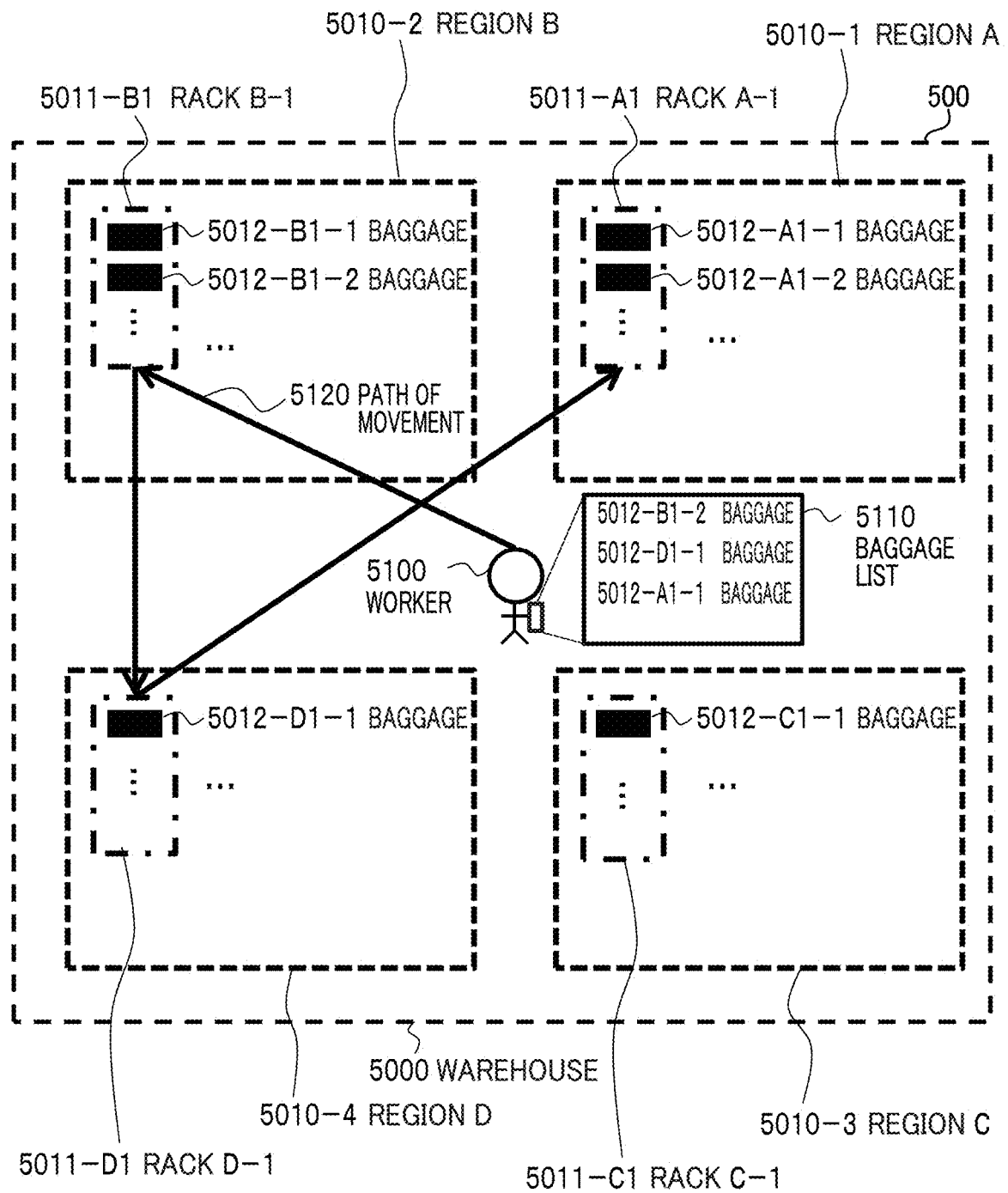
FIG. 29 is a diagram showing an example of a concept of pickup work in the fifth embodiment.

The pickup work for the baggage arranged in each of the above-described racks will next be described. FIG. 29 shows an example of the concept of the pickup work. In FIG. 29, a worker 5100 picks up pieces of baggage placed in the respective racks according to a predetermined baggage list 5110. In the present example, the pieces of baggage to be picked up are pieces of baggage 5012-A1-1, 5012-B1-2, and 5012-D1-1. The worker 5100 therefore goes to the racks 5011-A1, 5011-B1, and 5011-D1 in which the respective pieces of baggage are placed. In that case, a path of movement of the worker is a path of movement 5120, for example. In this case, order of the pickup of the baggage is not specified.

Figure 30:
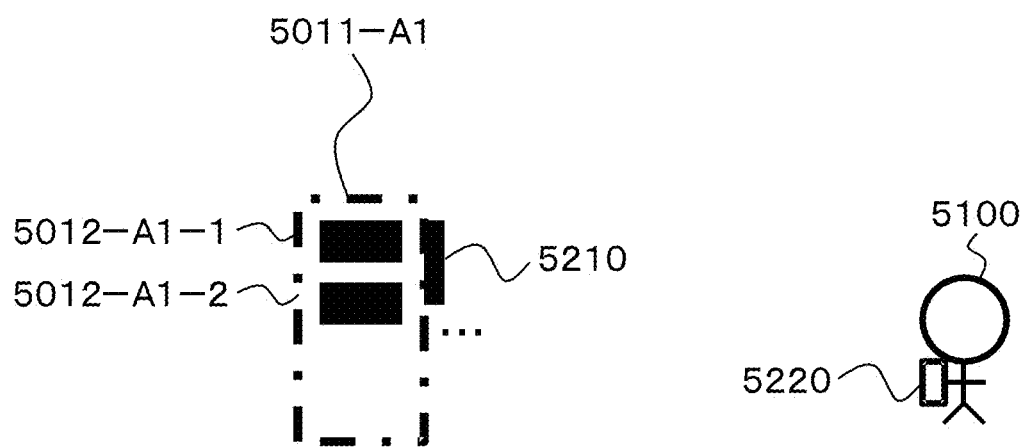
FIG. 30 is a diagram showing an example of a computer provided to a rack and a mobile terminal retained by a worker in the fifth embodiment.
Figure 31:
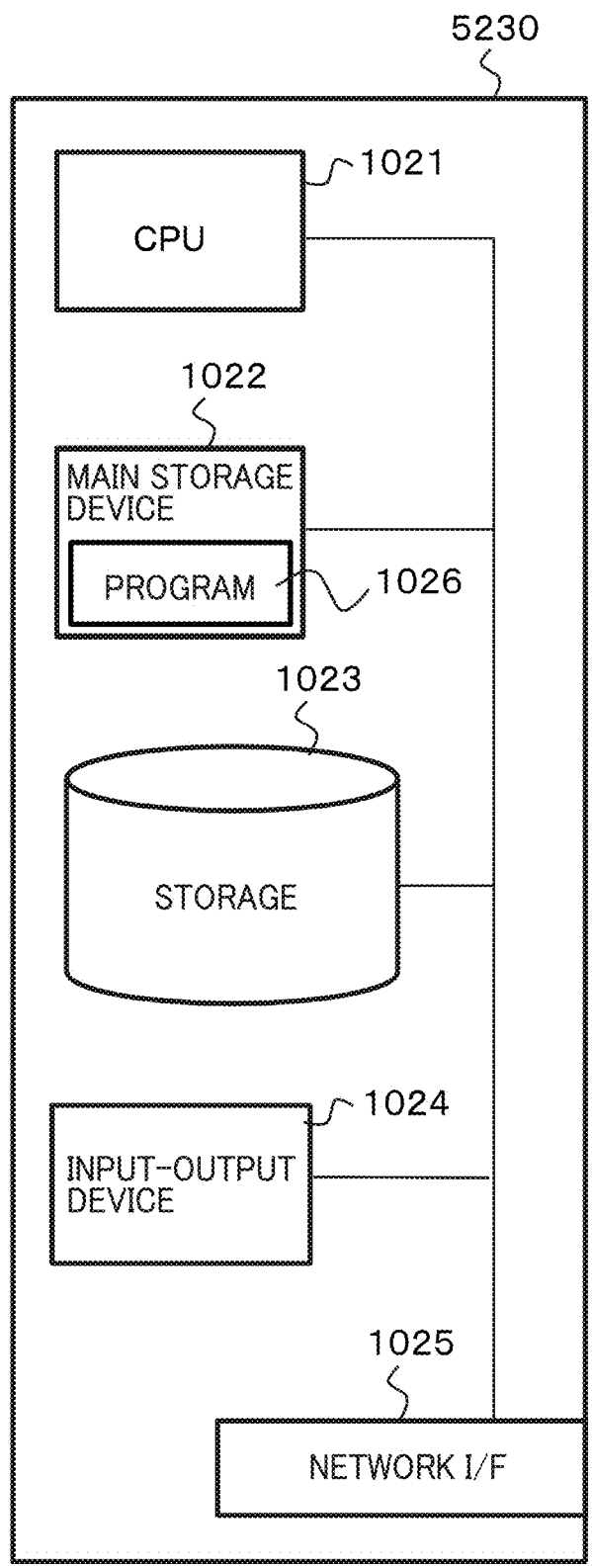
FIG. 31 is a diagram showing an example of hardware configuration of the computer and the mobile terminal in the fifth embodiment.

Description will next be made of a method that, in a case where there are a plurality of workers in the above-described baggage pickup work, reduces paths of movement of the workers by the information processing method according to the present embodiment. FIG. 30 shows a computer provided to a rack and a mobile terminal retained by a worker. In the present example, a computer 5210 is installed on each rack, and each worker 5100 retains a mobile terminal 5220. FIG. 31 shows an example of configuration of such a computer 5210 and such a mobile terminal 5220.

Figure 32:
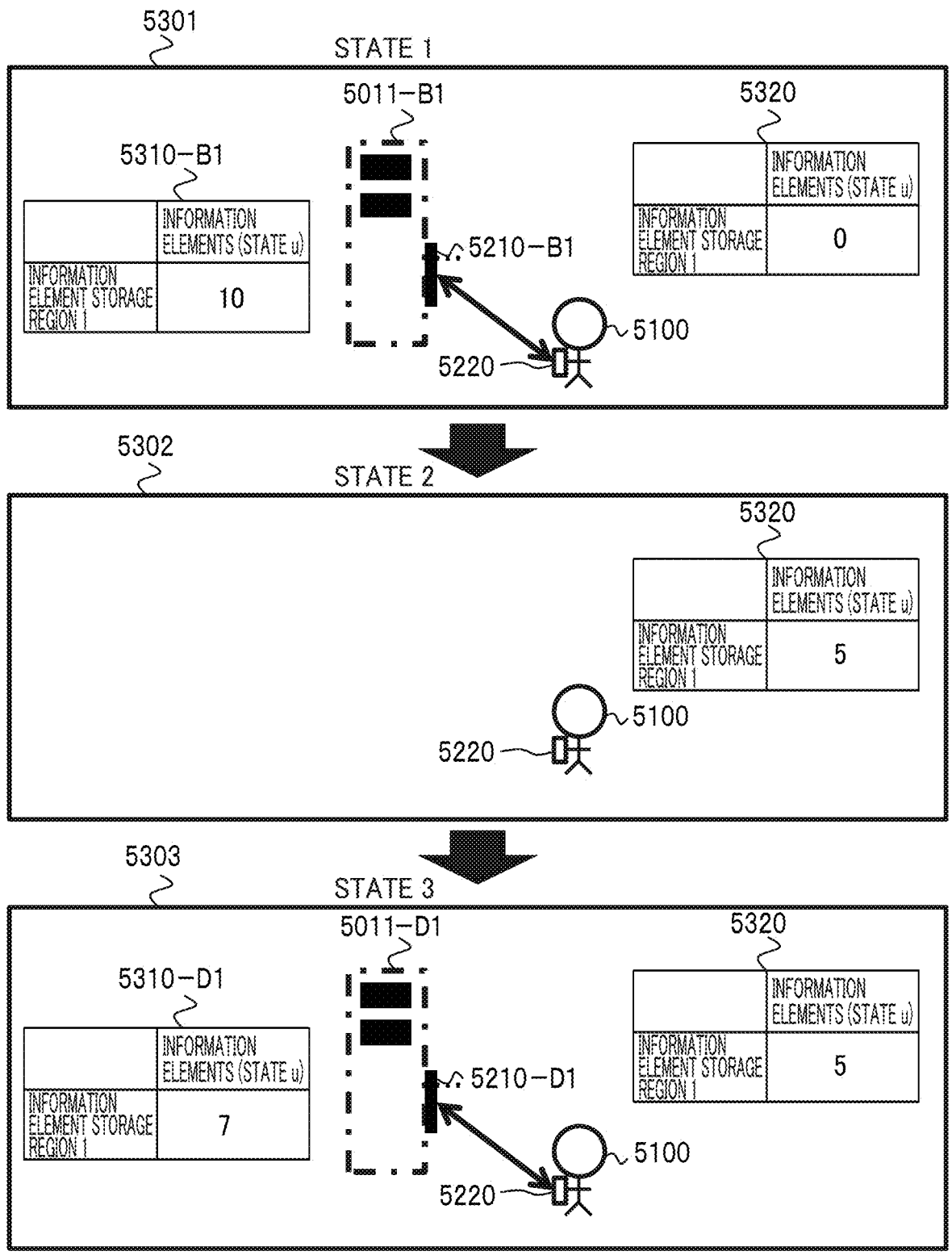
FIG. 32 is a diagram showing a concept of a flow of an information processing method in the fifth embodiment.

Description will next be made of the concept of a flow in the information processing method in the present example. FIG. 32 shows an example of a series of pieces of work in which after a state 1 (5301), in which the worker 5100 obtains baggage from the rack B-1 (5011-B1), a state 2 (5302) occurs when the above-described worker 5100 moves from the rack B-1 (5011-B1) to the rack D-1 (5011-D1), and thereafter a state 3 (5303) is reached when the worker 5100 obtains baggage from the rack D-1 (5011-D1).

When the worker 5100 obtains baggage from the rack B-1 in the above-described state 1 (5301), communication is performed between the mobile terminal 5220 retained by the worker 5100 and the computer 5210-B1 provided to the rack B-1 to update the numbers of information elements of each other. In addition, when the worker 5100 in the state 2 moves from the rack, and obtains baggage from the different rack 5011-D1 in the state 3, communication is performed between the mobile terminal 5220 retained by the worker 5100 and the computer 5210-D1 provided to the rack D-1 to update the numbers of information elements of each other.

That is, information elements move from the rack B-1 to the rack D-1 via the worker 5100. Information elements are circulated between racks when each of the plurality of workers performs such operation.

Figure 33:
FIG. 33 is a diagram showing a table describing relation between computers provided to respective racks and movement destinations in the fifth embodiment.

The computer 5210 of each rack thereafter calculates the movement destination of the rack from the numbers of information elements provided to the computer itself. For example, in a case where there are two kinds of information elements (the state u and the state v), a region as the movement destination is A when the number of information elements in the state u is larger than the number of information elements in the state v, and the region as the movement destination is B when the number of information elements in the state u is equal to or smaller than the number of information elements in the state v. FIG. 33 shows a table 5400 describing relation between the computers 5210 provided to the respective racks and the movement destinations. From this table 5400, the movement destination of the rack A-1 and the rack B-2 are the region B, and the movement destination of the rack A-2, the rack B-1, and the rack B-3 are the region A. Thereafter, each rack moves according to the above-described movement destination region. This movement is performed by a self-propelled mechanism of the rack receiving an instruction from the computer 5210 or a robot that moves the rack. In addition, timing of performing such movement may be in the nighttime every day or may be on alternate days or the like according to an instruction from the computer 5210.

Figure 34:
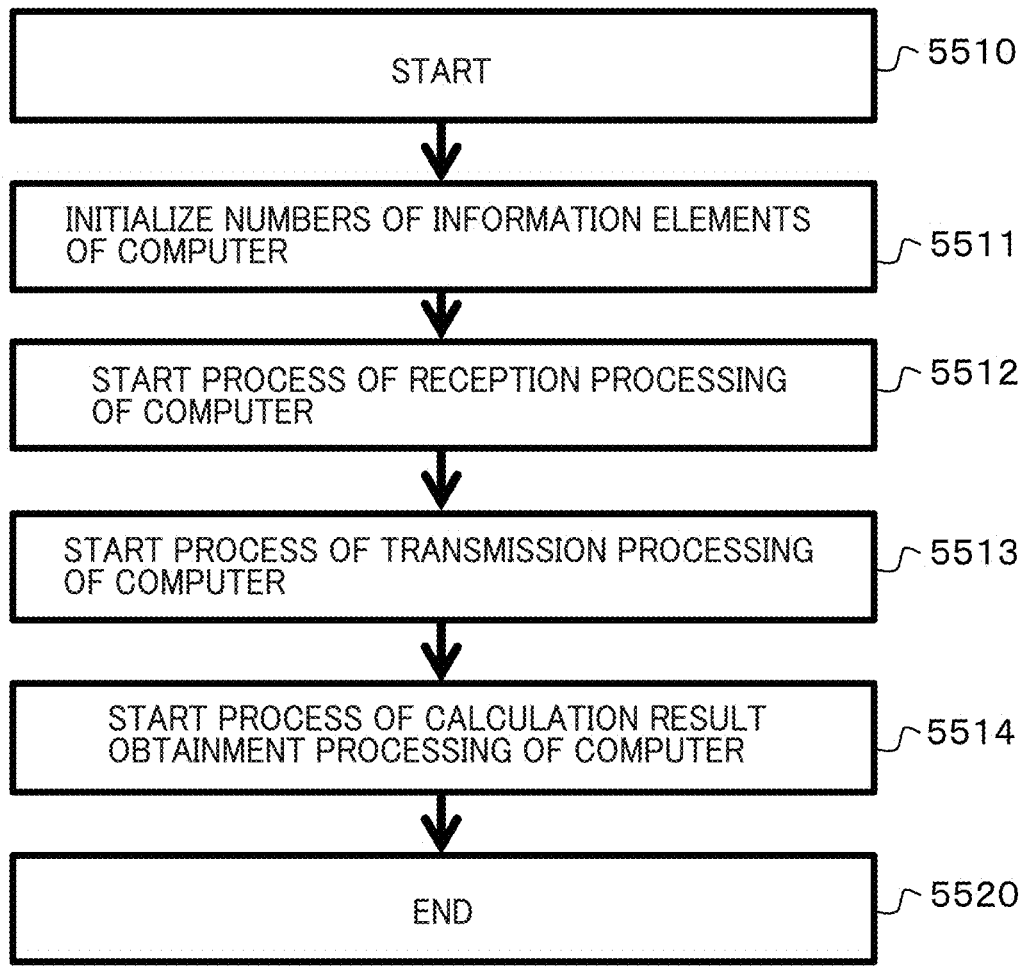
FIG. 34 is a diagram showing an example of a flowchart of a computer in the fifth embodiment.

A flowchart of the computer 5210 in the present example will next be described. FIG. 34 is a flowchart of each of the computers 5210. After starting the flow, each computer 5210 initializes the numbers of information elements (step 5511). Thereafter, processes of reception processing (step 5512) and transmission processing (step 5513) of the computer 5210 are started. The computer 5210 then starts calculation result obtainment processing (step 5514). Such pieces of processing (steps 5511 to 5513) can be made similar to the pieces of processing (steps 3111 to 3114) described in FIG. 17 related to the third embodiment.

Figure 35:
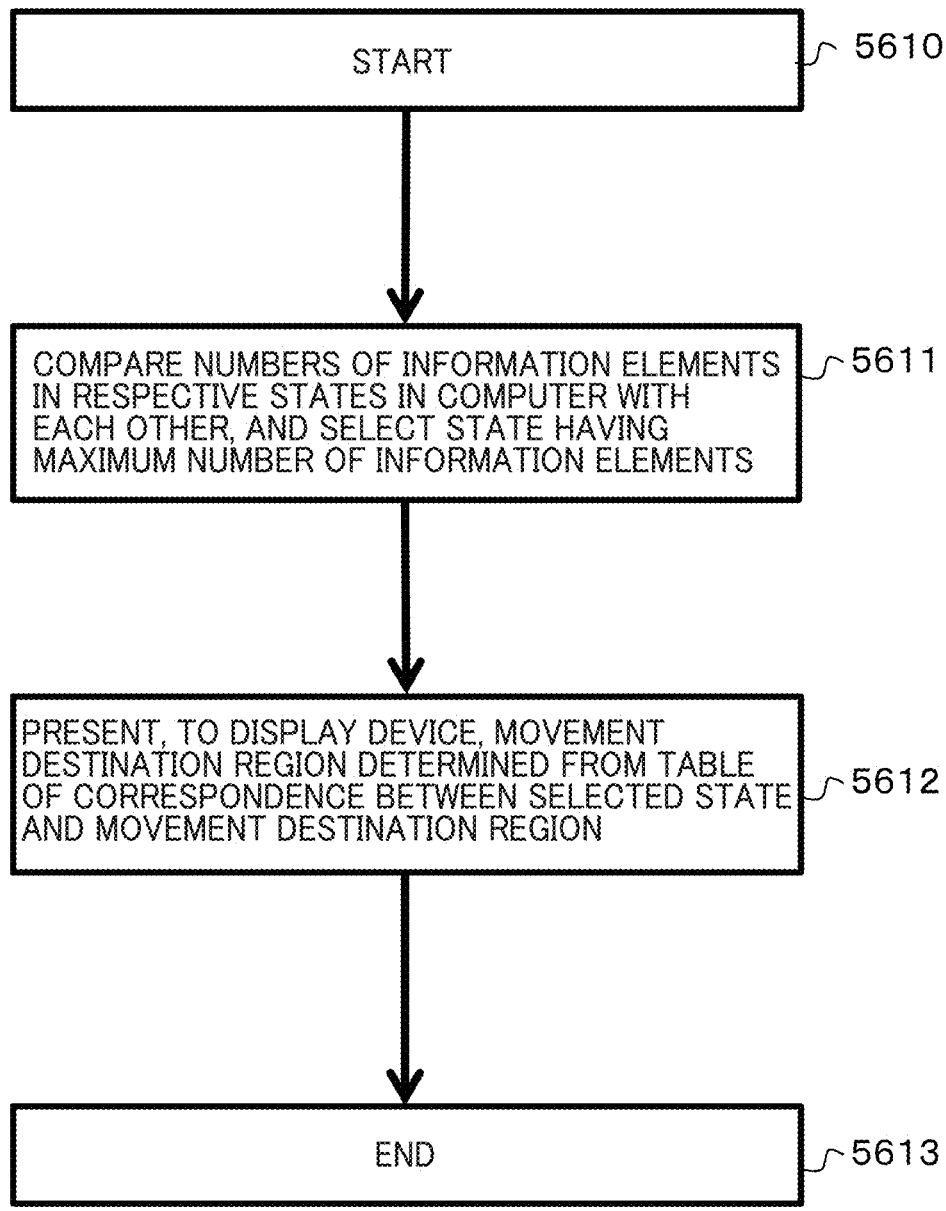
FIG. 35 is a diagram showing an example of a flowchart of calculation result obtainment processing in the fifth embodiment.

FIG. 35 is a flowchart related to the calculation result obtainment processing (step 5514) among these pieces of processing. In step 5611 in the flow, each computer 5210 compares the numbers of information elements in the respective states, which numbers are retained by the computer itself, with each other, and selects the state that has a maximum number of information elements. For example, in a case where the number of states is two (u and v), and the number of information elements in the state u on a certain vertex is one and the number of information elements in the state v on the vertex is two, the computer 5210 selects the state v. The computer 5210 in step 5612 then determines the movement destination region corresponding to the state selected in step 5611 described above, and displays the movement destination region on a predetermined display device connected by a network or the like or the input-output device 1024 of the computer itself. For example, when the state v is the state of the maximum, the corresponding region is the region B (the state u is the region A).

Figure 36:
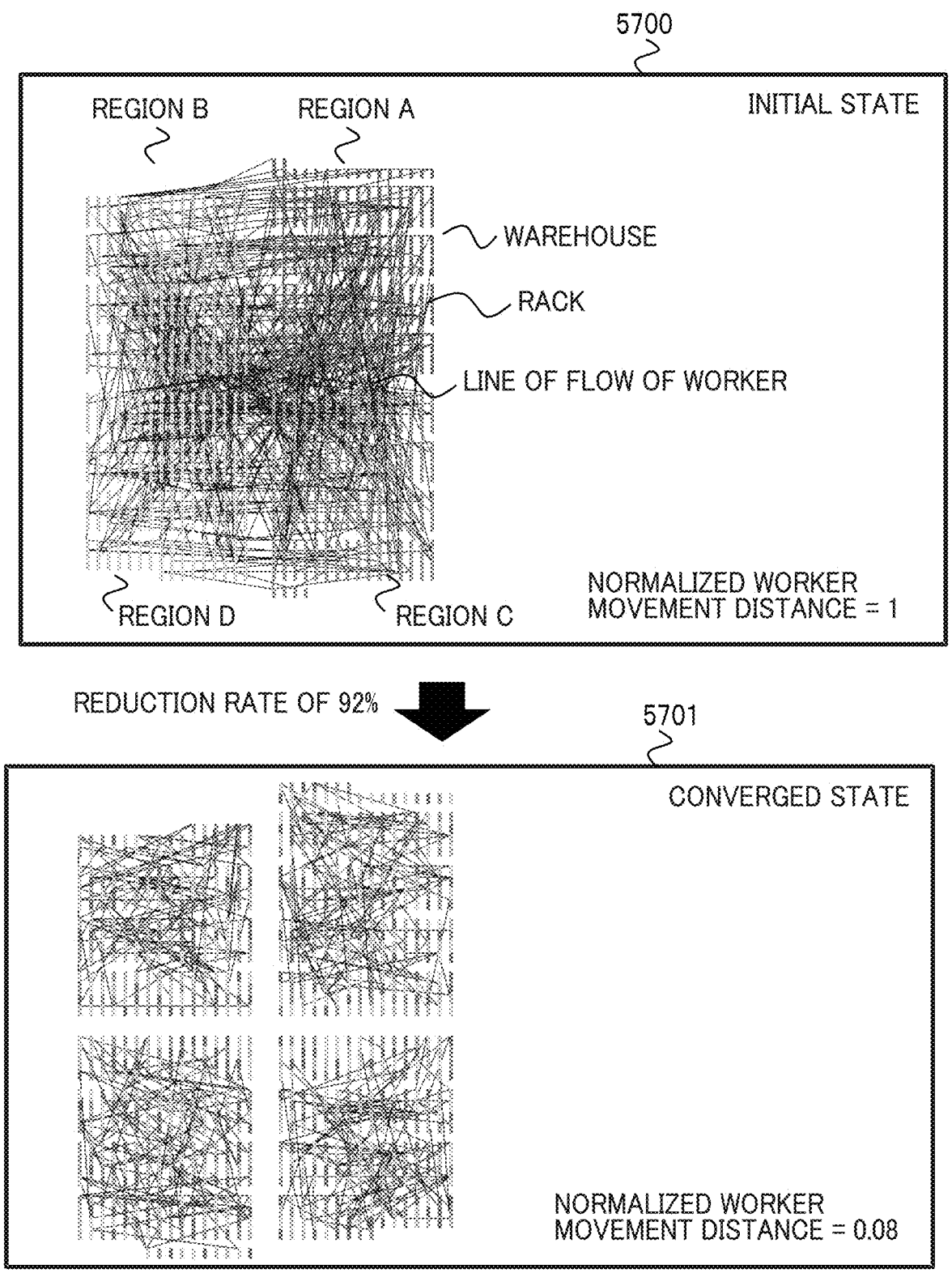
FIG. 36 is a diagram showing an example of an effect of the fifth embodiment.

The effect of the present fifth embodiment is as shown in FIG. 36. FIG. 36 shows an effect of reducing the movement distance of workers by a simulation of the above-described rack movement by the computers 5210. In the present example, supposing that the movement distance in an initial state 5700 is one, in a converged state 5701 in a case where rack movement based on a result of analysis according to the present fifth embodiment was performed, the movement distance of workers performing the pickup work in the warehouse was 0.08, and the reducing effect was 92%.

Sixth Embodiment

Description will next be made of an information processing method as a sixth embodiment in dealing with a problem of user clustering, that is, community detection in interaction service between a plurality of users, such as social network service or the like. In this case, an information processing system is assumed in which each vertex in the foregoing third embodiment is a user and edges between vertices are interaction between the users. In this case, the interaction corresponds to for example the transmission and reception of email, the transmission and reception of messages, the visiting of individual pages, posting, and the like.

Figure 37:
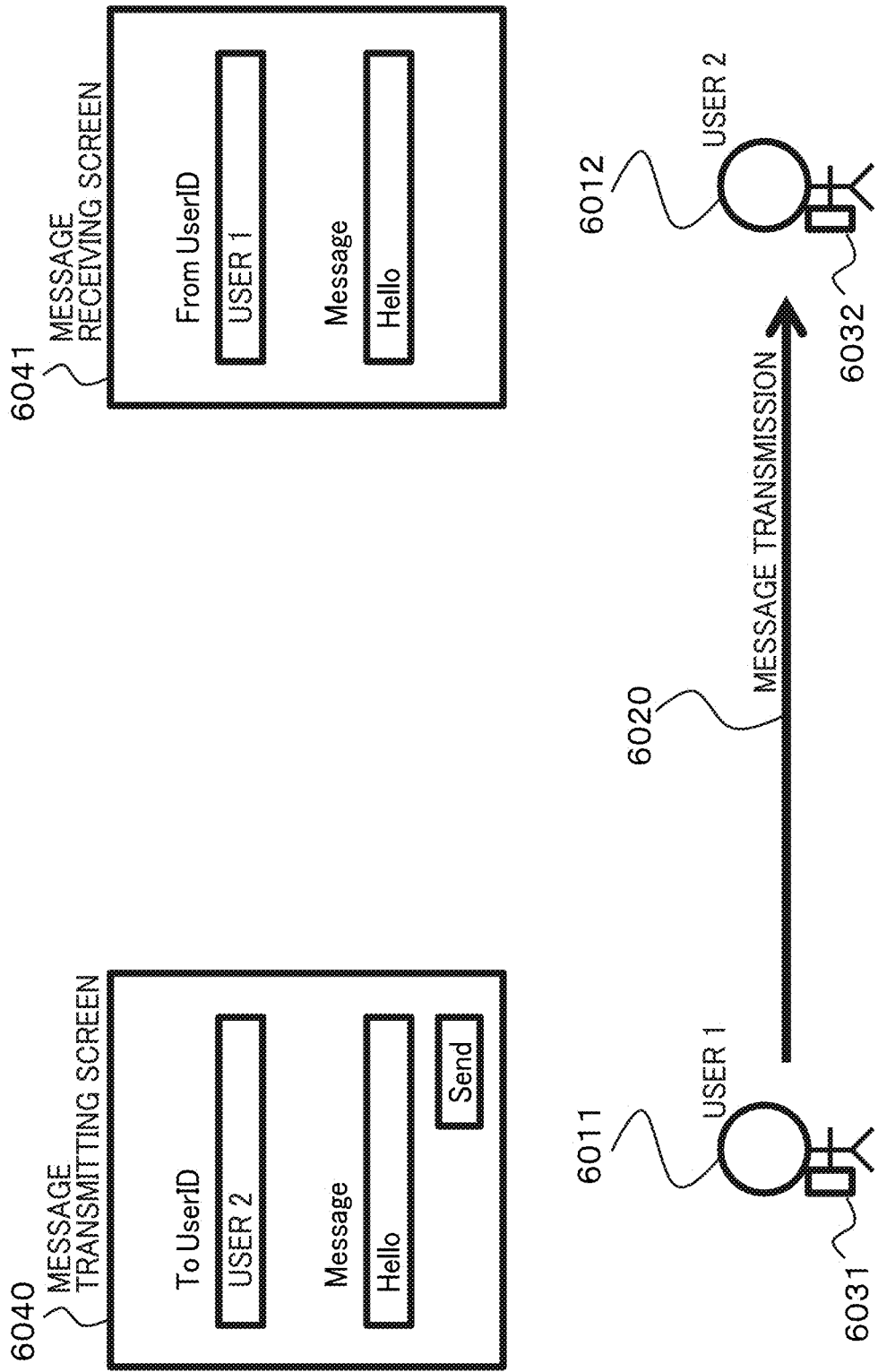
FIG. 37 is a diagram showing an example of a concept in a sixth embodiment.

FIG. 37 shows an example of the concept of the present sixth embodiment. Suppose in FIG. 37 that a user 1 (6011) and a user 2 (6012) use respective terminals 6031 and 6032 possessed by the respective users, and that message transmission (6020) is performed through the interaction service. In this case, the user 1 transmits a message from a message transmitting screen 6040, for example, to the user 2 by operating the terminal 1 (6031) possessed by the user 1. This message is delivered to the terminal 2 of the user 2 (6032) via an information processing system of the interaction service such as a server or the like. A message receiving screen 6041, for example, is then displayed on the terminal.

Figure 38:
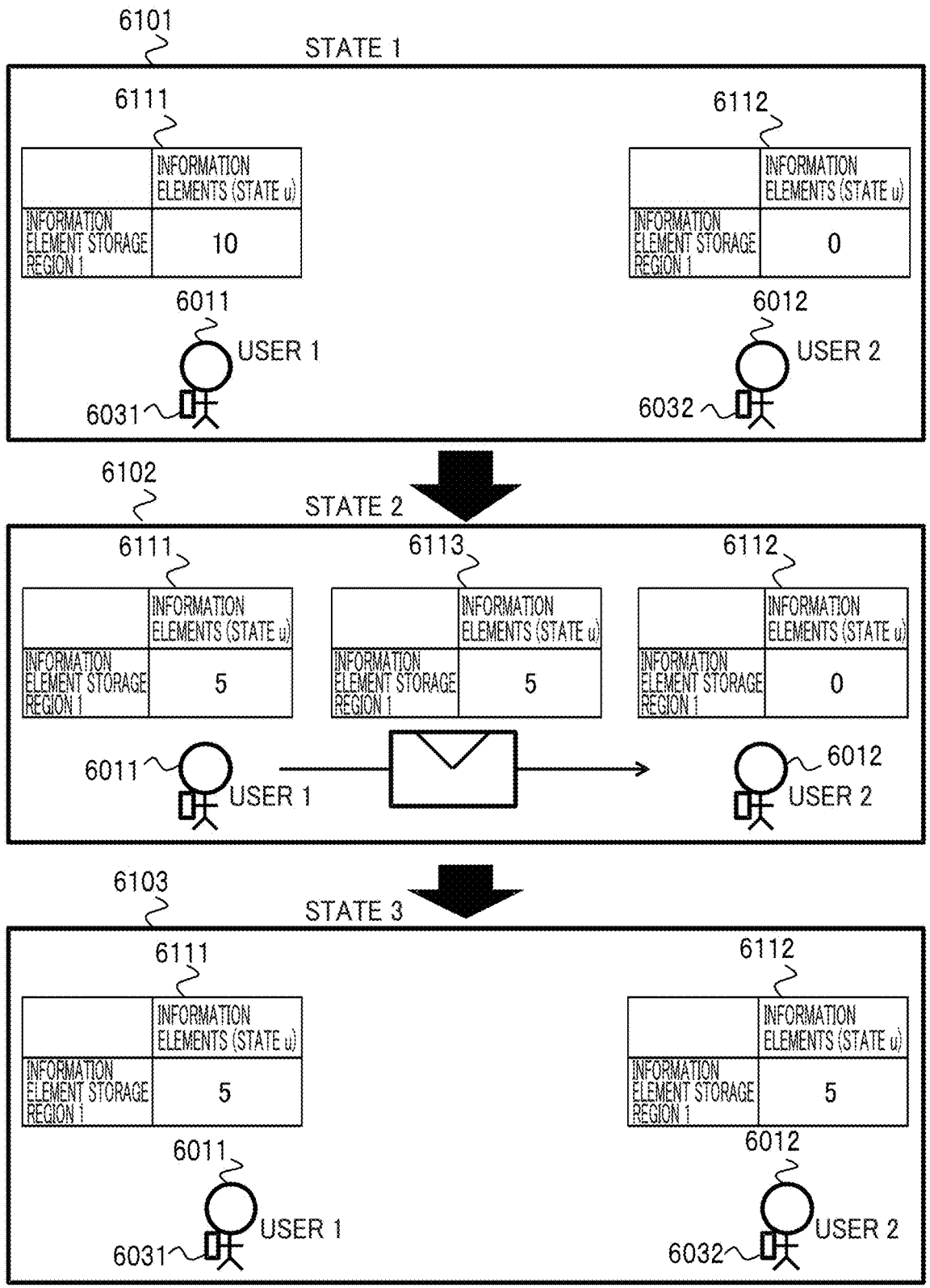
FIG. 38 is a diagram showing an example of exchange of information elements in the sixth embodiment.

FIG. 38 shows an example of exchange of information elements in the present sixth embodiment. Suppose in FIG. 38 that the information elements are stored in the terminals retained by the respective users or storage areas for the respective users in information processing service providing the above-described interaction service. Suppose that an initial state in this case is a state 1 (6101). When the user 1 (6011) then transmits the message to the user 2 (6012), the terminals 6031 and 6032 add information elements to the message. An example of a number of information elements 6113 added to the message by the terminals 6031 and 6032 is shown in a state 2 (6102). In this example, five information elements are added from the terminal 6031 of the user 1.

Figure 39:
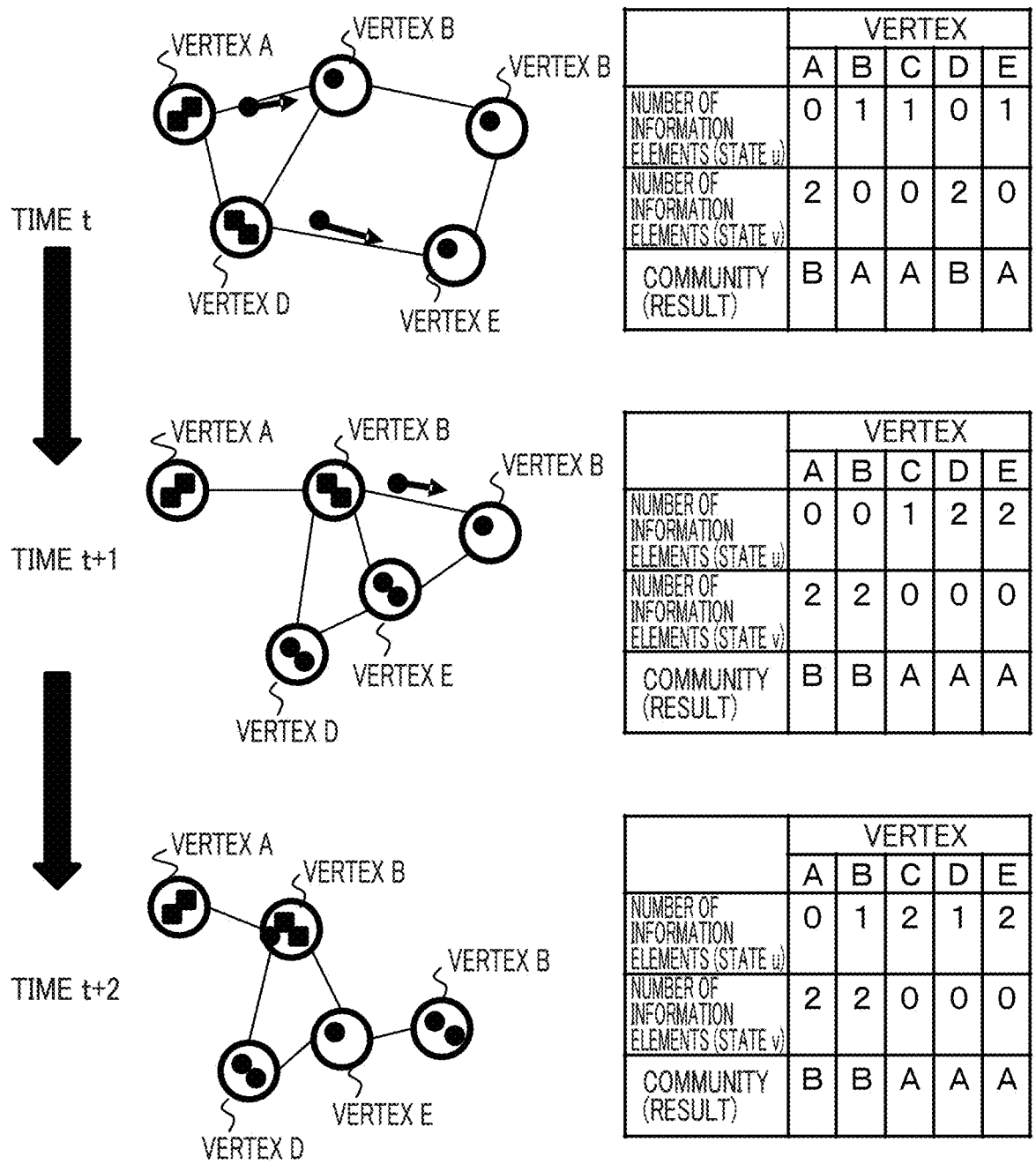
FIG. 39 is a diagram showing an example of a concept of identifying communities to which respective users belong from the numbers of information elements of respective vertices in the sixth embodiment.

When the terminal 6032 of the user 2 thereafter receives the above-described message in a state 3 (6103), a number of information elements 6112 retained by the terminal 6032 of the user 2 is updated on the basis of the information elements added to the above-described message. The series of procedures described above causes information elements to circulate between users via messages. As shown in the third embodiment and FIG. 39, communities to which the respective users (=vertices) belong are identified from the thus updated numbers of information elements of the respective vertices (state at time t+2 in FIG. 39). There may be an application for the thus identified communities in which application for example a keyword appearing frequently is extracted from text information disclosed by users belonging to a same community, and marketing is performed directed to the users belonging to the community. From the above, the present embodiment can detect communities of users on the interaction service.

Seventh Embodiment

A mode will next be illustrated as a seventh embodiment, the mode simulating an optimum arrangement of racks in the warehouse illustrated in the foregoing fifth embodiment in a case where the baggage list 5110 of each worker 5100 in FIG. 29 can be obtained in advance. In the foregoing fifth embodiment, an optimum arrangement of racks is performed according to the movement of the worker 5100 within the warehouse. In the present seventh embodiment, on the other hand, when there is a sufficient time from the obtainment of the baggage list 5110 by the computers 5210 to the shipment of the baggage in the baggage list 5110, for example, the computers 5210 generate graph structure data from the baggage list 5110, and perform calculation similar to that of the information processing system 100 illustrated in the first embodiment.

The computers 5210 calculate the movement destinations of the racks from a result of the calculation (classification result) on the basis of the table of relation between classification results (numbers of information elements) and the movement destination regions, which table has been illustrated in the foregoing fifth embodiment. After such calculation of the movement destinations of the racks by the computers 5210, the racks are arranged according to the movement destinations of the racks calculated by the computers 5210 before the worker 5100 actually starts the baggage pickup work within the warehouse. Means for arranging the racks is similar to that of the fifth embodiment. Hence, the present seventh embodiment corresponds to a method in which the computers 5210 generate graph structure data from one or more baggage lists 5110.

Figure 40:
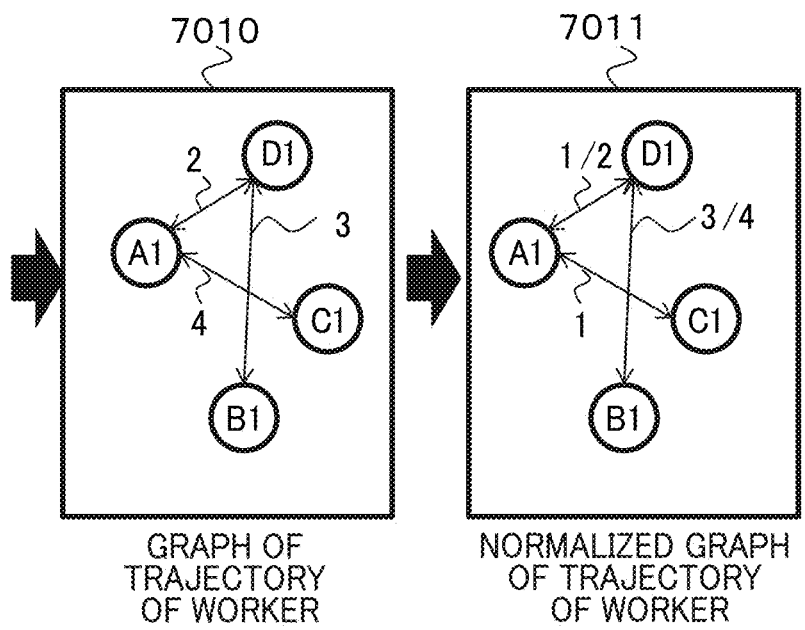
FIG. 40 is a diagram showing an example of a concept in a seventh embodiment.

Description will be made of a concept of the computers 5210 generating graph structure data from the above-described baggage list. FIG. 40 shows a conceptual diagram of the seventh embodiment. Suppose in this case, for example, that there are three baggage lists 7001, 7002, and 7003, and that the worker 5100 picks up baggage in numerical order of these lists 7001 to 7003. In addition, supposing that each rack is a vertex, the trajectory of movement of the worker 5100 within the warehouse can be expressed as in a graph 7010 of the trajectory of the worker 5100. A value added to each edge in the graph 7010 is a number of times of passage of the worker. The normalization of the edges in the graph 7010 by a maximum number of the above-described numbers of times of passage provides a normalized graph 7011 of the trajectory of the worker, for example. This graph 7011 represents graph structure data with a weight added to each edge.

The vertices, that is, the racks can be classified when an information processing system similar to those of the first and second embodiments processes such graph structure data. The movement destination of each rack can be calculated by calculating the movement destinations corresponding to a result of the classification by the method according to the fifth embodiment.

Eighth Embodiment

A mode in which a computer of the information processing system has the transition probability Equation (Mathematical Equation 1) in the first embodiment as a table will next be illustrated as an eighth embodiment. FIGS. 41 to 43 show respective examples of transition probability tables 8001 to 8003 as transition probability tables 1 to 3. The computer of the information processing system can determine the transition probability by checking the numbers of information elements (u and v) of the own vertex and the numbers of information elements of the adjacent vertices (ΣNju and ΣNjv) against the transition probability tables 8001 to 8003, and identifying a corresponding value in the tables. Values in the above-described tables 8001 to 8003 are obtained when the computer performs simulation in advance, and empirically calculates the values providing an intended result.

As described above, according to the information processing system and the information processing method in accordance with the present embodiment, it is possible to perform efficient calculation on large-scale data that cannot be collected at one place or data updated momently.

The description of the present specification clarifies at least the following. In the information processing system according to the present embodiment, each of the computers may determine, as the attribute of the corresponding vertex, the attribute of a largest number of pieces of identifier data in the identifier data retained by the computer itself in relation to the vertex. According to this, events corresponding to the respective vertices can be clustered efficiently.

In addition, in the above-described information processing system, each of the computers may retain, as the algorithm, a mathematical equation for calculating the transition probability of the identifier data from the own computer to the other adjacent computer by a predetermined function having, as variables, the number of pieces of the identifier data related to each of the vertices retained by the computer itself and the number of pieces of the identifier data related to each of the vertices retained by the adjacent computer, and calculate the transition probability using the mathematical equation. According to this, efficient and accurate update processing can be performed for the numbers of pieces of the identifier data as a basis for the clustering of events.

In addition, in the above-described information processing system, each of the computers may retain, as the algorithm, a table defining the transition probability of the identifier data from the own computer to the other adjacent computer, the table being determined in advance according to relation between the number of pieces of the identifier data related to each of the vertices retained by the computer itself and the number of pieces of the identifier data related to each of the vertices retained by the adjacent computer, and calculate the transition probability using the table. According to this, more efficient and accurate update processing can be performed for the numbers of pieces of the identifier data as a basis for the clustering of events.

In addition, in the above-described information processing system, when updating the numbers of pieces of the identifier data according to the result of the calculation of the transition probability, each of the computers may perform the updating so as to maintain a sum total of the numbers of pieces of the identifier data retained by the computer itself and the adjacent computer. According to this, In addition, in the above-described information processing system, one computer may correspond to a plurality of vertices in the graph structure. According to this, the information processing method according to the present invention can be performed in a server device that has control over a plurality of vertices, that is, a plurality of events.

In addition, in an information processing system in the present embodiment, the information processing system including a plurality of terminals configured to transmit and receive a message via a network and a managing computer, when terminals come into physical proximity to each other, the terminals may perform direct communication with each other in place of the transmission and reception of the message via the network, and update the numbers of pieces of the identifier data retained by the terminals. According to this, processing can be performed so as to support modes of sending and receiving messages by not only wide-area communication lines such as the Internet or the like but also means of various kinds of proximity radio communications or the like.

In addition, in the information processing method according to the present embodiment, each of the computers may determine, as the attribute of the corresponding vertex, the attribute of a largest number of pieces of identifier data in the identifier data retained by the computer itself in relation to the vertex.

In addition, in the above-described information processing method, each of the computers may retain, as the algorithm, a mathematical equation for calculating the transition probability of the identifier data from the own computer to the other adjacent computer by a predetermined function having, as variables, the number of pieces of the identifier data related to each of the vertices retained by the computer itself and the number of pieces of the identifier data related to each of the vertices retained by the adjacent computer, and calculate the transition probability using the mathematical equation.

In addition, in the above-described information processing method, each of the computers may retain, as the algorithm, a table defining the transition probability of the identifier data from the own computer to the other adjacent computer, the table being determined in advance according to relation between the number of pieces of the identifier data related to each of the vertices retained by the computer itself and the number of pieces of the identifier data related to each of the vertices retained by the adjacent computer, and calculate the transition probability using the table.

DESCRIPTION OF REFERENCE CHARACTERS

1: Network
100: Information processing system
220: Computer
221: CPU
222: Main storage device
223: Storage
225: Network interface
226: Program
3020: Device
5011: Rack
5220: Mobile terminal

The invention claimed is:

1. An information processing method comprising:
arranging a plurality of computers according to a graph structure as a model, the graph structure being formed by a plurality of vertices corresponding to events as objects of analysis and each of the plurality of computers having an edge connecting each two adjacent vertices of said plurality of vertices to each other according to a relation between corresponding events, each of the plurality of computers corresponding to a respective vertex of the plurality of vertices of said graph structure, each adjacent pair of the plurality of computers being connected to each other so as to be able to send and receive data in correspondence with the edge, and retaining identifier data having an attribute indicating one or more states for the events associated with the vertices,
calculating a transition probability of identifier data between each of the pairs of computers corresponding to the edge connected the adjacent vertices, by a predetermined algorithm based on numbers of pieces of the identifier data retained by the mutual computers, and updating the numbers of pieces of the identifier data retained by the mutual computers according to a result of the calculation; and displaying, on a display device, the number of pieces of the identifier data retained in relation to each of the vertices as a space distribution diagram based on distribution of the vertices, wherein said calculating said transition probability converges to a same result regardless of a calculation order among said plurality of computers each corresponding to a respective vertex of the plurality of vertices of said graph structure.

2. The information processing method according to claim 1, wherein each of the computers determines, as the attribute of the corresponding vertex, the attribute of a largest number of pieces of identifier data in the identifier data retained by the computer itself in relation to the vertex.

3. The information processing method according to claim 1, wherein each of the computers retains, as the algorithm, a mathematical equation for calculating the transition probability of the identifier data from said one computer to said other adjacent computer by a predetermined function having, as variables, the number of pieces of the identifier data related to each of the vertices retained by the computer itself and the number of pieces of the identifier data related to each of the vertices retained by the adjacent computer, and calculates the transition probability using the mathematical equation.

4. The information processing method according to claim 1, wherein each of the computers retains, as the algorithm, a table defining the transition probability of the identifier data from said one computer to said other adjacent computer, the table being determined in advance according to relation between the number of pieces of the identifier data related to each of the vertices retained by the computer itself and the number of pieces of the identifier data related to each of the vertices retained by the adjacent computer, and calculates the transition probability using the table.

5. An information processing system comprising:

a plurality of computers arranged according to a graph structure as a model, the graph structure being formed by a plurality of vertices corresponding to events as objects of analysis and each of the plurality of computers having an edge connecting each two adjacent vertices of said plurality of vertices to each other according to a relation between corresponding events, each of the plurality of computers corresponding to a respective vertex of the plurality of vertices of said graph structure and each adjacent pair of the plurality of computers being connected to each other so as to be able to send and receive data in correspondence with the edge;

a storage device configured to retain identifier data having an attribute indicating one or more states for each of the events associated with one or more of the plurality of vertices, the identifier data being accumulated in each computer; and a display device configured to display a number of pieces of the identifier data retained in the storage device in relation to each of the vertices as a space distribution diagram based on distribution of the vertices;

each of the computers calculating a transition probability of identifier data between one said computer and another one of said computers corresponding to an adjacent vertex connected by the edge, by a predetermined algorithm based on the numbers of pieces of the identifier data retained by the mutual computers, and updating the numbers of pieces of the identifier data retained by the mutual computers according to a result of the calculation, wherein said calculating of said transition probability converges to a same result regardless of a calculation order among said plurality of computers each corresponding to a respective vertex of the plurality of vertices of said graph structure.

6. The information processing system according to claim 5, wherein each of the computers determines, as the attribute of the corresponding vertex, the attribute of a largest number of pieces of identifier data in the identifier data retained by the computer itself in relation to the vertex.

7. The information processing system according to claim 5, wherein each of the computers retains, as the algorithm, a mathematical equation for calculating the transition probability of the identifier data from said one computer to said other adjacent computer by a predetermined function having, as variables, the number of pieces of the identifier data related to each of the vertices retained by the computer itself and the number of pieces of the identifier data related to each of the vertices retained by the adjacent computer, and calculates the transition probability using the mathematical equation.

8. The information processing system according to claim 5, wherein each of the computers retains, as the algorithm, a table defining the transition probability of the identifier data from said one computer to said other adjacent computer, the table being determined in advance according to relation between the number of pieces of the identifier data related to each of the vertices retained by the computer itself and the number of pieces of the identifier data related to each of the vertices retained by the adjacent computer, and calculates the transition probability using the table.

9. The information processing system according to claim 5, wherein when updating the numbers of pieces of the identifier data according to the result of the calculation of the transition probability, each of the computers performs the updating so as to maintain a sum total of the numbers of pieces of the identifier data retained by the computer itself and the adjacent computer.

10. The information processing system according to claim 5, wherein one computer corresponds to a plurality of vertices in the graph structure.

11. An information processing system comprising:

a managing computer;

computers installed on respective racks within a warehouse; and portable terminals carried by respective workers collecting baggage arranged in the racks, the portable terminals being able to access the computers;

each of the computers retaining information on numbers of pieces of identifier data of a plurality of kinds of information elements corresponding to respective predetermined events related to the racks or the baggage arranged in the corresponding racks, and receiving identifier data retained by each of the portable terminals when accessed by the portable terminal, transmitting identifier data determined on a basis of conditions of past changes in the identifier data already retained by the computer to the portable terminal, and updating the numbers of pieces of the identifier data of the plurality of kinds of information elements, the identifier data of the plurality of kinds of information elements being retained by the computer, on a basis of a subtracted number as a result of the transmission and reception of the identifier data to and from the portable terminal, each of the portable terminals
receiving the identifier data from the computer, and updating identifier data retained by the portable terminal itself on a basis of the received identifier data,
wherein said updating of the identifier data retained by the portable terminal is performed independently of an order of said receiving of said identifier data from each of the portable terminals by said managing computer, and each of the computers
outputting, to the managing computer, an instruction to move the rack on which the computer itself is installed to an arrangement destination associated with a kind corresponding to a largest number of the numbers of pieces of the identifier data of the plurality of kinds of information elements, the identifier data of the plurality of kinds of information elements being retained by the computer itself, after passage of a predetermined time from the updating of the numbers of pieces of the identifier data.

12. An information processing system comprising:
a managing computer; and
computers associated with respective pieces of data within a data center;
each of the computers
retaining information on numbers of pieces of identifier data of a plurality of kinds of information elements corresponding to respective predetermined events related to the data, and
when accessed by programs using each of the pieces of data, receiving identifier data retained by the programs, giving the programs identifier data determined on a basis of conditions of past changes in the identifier data already retained by the computer, and updating the numbers of pieces of the identifier data of the plurality of kinds of information elements, the identifier data of the plurality of kinds of information elements being retained by the computer, on a basis of a subtracted number as a result of the transmission and reception of the identifier data to and from the programs, each of the programs
receiving the identifier data from the computer, and updating identifier data retained by the program itself on a basis of the received identifier data, and each of the computers
outputting, to the managing computer, an instruction to move the data with which the computer itself is associated to an arrangement destination associated with a kind corresponding to a largest number of the numbers of pieces of the identifier data of the plurality of kinds of information elements, the identifier data of the plurality of kinds of information elements being retained by the computer itself, after passage of a predetermined time from the updating of the numbers of pieces of the identifier data, wherein said updating identifier data retained by the program is performed independently of an order of said receiving of said identifier data from each of the programs.

13. An information processing system comprising:
a plurality of terminals configured to transmit and receive a message via a network; and
a managing computer;
each of the terminals
retaining information on numbers of pieces of identifier data of a plurality of kinds of information elements,
when transmitting the message, transmitting, to another terminal among the plurality of terminals, the message to which identifier data determined on a basis of conditions of past changes in the numbers of pieces of identifier data already retained by the terminal itself is added, and updating the numbers of pieces of the identifier data of the plurality of kinds of information elements, the identifier data of the plurality of kinds of information elements being retained by the terminal itself, by subtracting a number of pieces of the transmitted identifier data,
when receiving the message, updating the numbers of pieces of the identifier data of the plurality of kinds of information elements, the identifier data of the plurality of kinds of information elements being retained by the terminal itself, by adding a number of pieces of identifier data added to the received message, and
transmitting, to the managing computer, the numbers of pieces of the identifier data of the plurality of kinds of information elements, the identifier data of the plurality of kinds of information elements being retained by the terminal itself, after passage of a predetermined time from the updating of the numbers of pieces of the identifier data,
wherein said updating of the number of pieces of the identifier data is performed independently of an order of said receiving of said identifier data from each of the terminals by said managing computer, and the managing computer
receiving the numbers of pieces of the identifier data of the plurality of kinds of information elements from each of the terminals, and displaying information indicating that terminals each having a largest number of pieces of identifier data belonging to a common kind of information element are in a same group on a display terminal of the managing computer.

14. The information processing system according to claim 13, wherein
when terminals come into physical proximity to each other, the terminals perform direct communication with each other in place of the transmission and reception of the message via the network, and update the numbers of pieces of the identifier data retained by the terminals.

* * * * *